(12) United States Patent
Shin et al.

(10) Patent No.: US 12,556,626 B2
(45) Date of Patent: Feb. 17, 2026

(54) FOLDABLE ELECTRONIC APPARATUS

(71) Applicant: SAMSUNG DISPLAY CO., LTD., Yongin-si (KR)

(72) Inventors: Jaiku Shin, Yongin-si (KR); Sung Chul Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 212 days.

(21) Appl. No.: 18/427,589

(22) Filed: Jan. 30, 2024

(65) Prior Publication Data

US 2024/0267443 A1 Aug. 8, 2024

(30) Foreign Application Priority Data

Feb. 2, 2023 (KR) ........................ 10-2023-0014333

(51) Int. Cl.
*H04M 1/02* (2006.01)
(52) U.S. Cl.
CPC ................................. *H04M 1/0222* (2013.01)
(58) Field of Classification Search
CPC ............. H04M 1/0222; H04M 1/0216; H04M 1/0268; G09F 9/301; G06F 1/1641; G06F 1/1652; H10K 77/111; H10K 2102/311
See application file for complete search history.

(56) References Cited

U.S. PATENT DOCUMENTS

| | | | |
|---|---|---|---|
| 10,164,208 B2 | 12/2018 | Lee et al. | |
| 10,495,941 B2 * | 12/2019 | Hashimoto | G02F 1/167 |
| 11,175,693 B2 | 11/2021 | Song et al. | |
| 11,508,922 B2 | 11/2022 | Park et al. | |
| 11,822,384 B2 * | 11/2023 | Lee | G06F 1/1626 |
| 12,189,418 B2 * | 1/2025 | Lee | G06F 1/16 |
| 12,277,004 B2 * | 4/2025 | Shim | G06F 1/1647 |

(Continued)

FOREIGN PATENT DOCUMENTS

| | | |
|---|---|---|
| CN | 115019639 A | 9/2022 |
| KR | 10-2018-0079091 A | 7/2018 |

(Continued)

OTHER PUBLICATIONS

Exam Report issued in corresponding WO Application (PCT/KR2024/001450) dated Apr. 26, 2024.

*Primary Examiner* — Lisa Lea-Edmonds
(74) *Attorney, Agent, or Firm* — F. CHAU & ASSOCIATES, LLC

(57) ABSTRACT

An electronic apparatus includes a display module including a folding portion folded about a folding axis extending along a first direction and first and second non-folding portions spaced apart from each other with the folding portion interposed therebetween. A support plate is disposed on a lower side of the display module and includes openings overlapping the folding portion. An adhesive layer is disposed on an upper side of the support plate and overlaps the folding portion, the first non-folding portion, and the second non-folding portion, and a cover attached on a lower side of the support plate, and overlapping at least the folding portion. A through portion passes through the cover along a through direction, and has a depth along a third direction which is perpendicular to first and second directions. The through portion is connected to at least one of the openings.

20 Claims, 34 Drawing Sheets

(56) References Cited

U.S. PATENT DOCUMENTS

| | | | |
|---|---|---|---|
| 12,298,805 B2 * | 5/2025 | Shin | G06F 1/1656 |
| 12,395,582 B2 * | 8/2025 | An | G06F 1/1658 |
| 2021/0373604 A1 | 12/2021 | Shin et al. | |
| 2022/0139274 A1 | 5/2022 | Sim et al. | |
| 2022/0216436 A1 | 7/2022 | Kim et al. | |
| 2022/0294886 A1 * | 9/2022 | Seo | G06F 1/1641 |
| 2022/0397934 A1 | 12/2022 | La et al. | |
| 2023/0099961 A1 * | 3/2023 | Lee | G06F 1/16 361/807 |
| 2023/0119209 A1 * | 4/2023 | Choi | G06F 1/1641 361/679.01 |
| 2024/0152188 A1 * | 5/2024 | Kim | G06F 1/1637 |
| 2024/0267443 A1 * | 8/2024 | Shin | H04M 1/0222 |
| 2025/0138578 A1 * | 5/2025 | Lee | G06F 1/16 |
| 2025/0251755 A1 * | 8/2025 | Shin | G06F 1/1656 |

FOREIGN PATENT DOCUMENTS

| | | |
|---|---|---|
| KR | 10-2021-0025747 A | 3/2021 |
| KR | 10-2022-0061305 A | 5/2022 |
| KR | 10-2022-0099165 A | 7/2022 |
| KR | 10-2022-0108506 A | 8/2022 |
| KR | 10-2442043 B1 | 9/2022 |
| KR | 10-2454623 81 | 10/2022 |
| KR | 10-2022-0158202 A | 11/2022 |
| KR | 10-2022-0167844 A | 12/2022 |

* cited by examiner

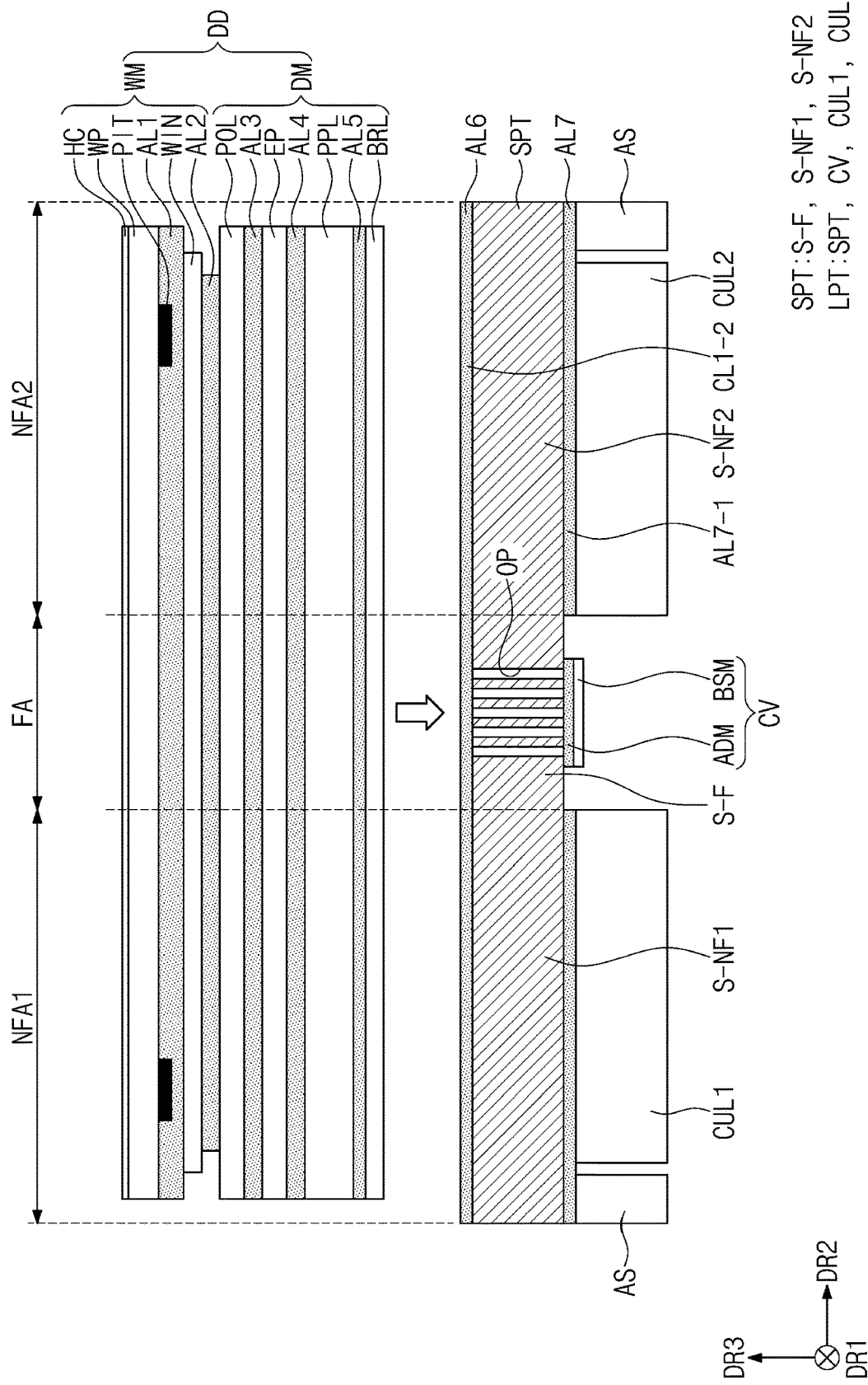

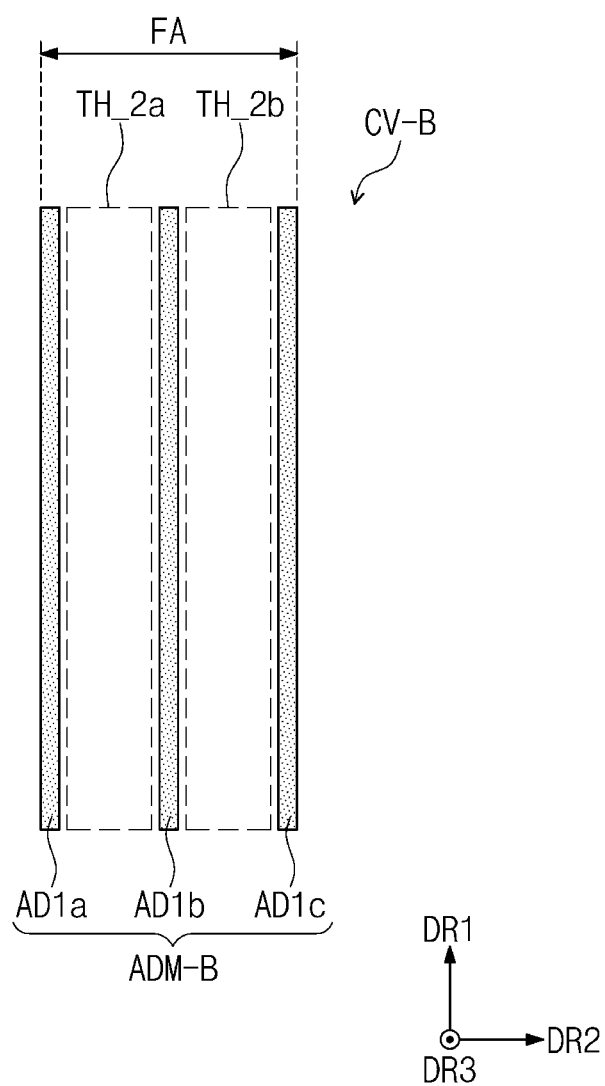

FOLDABLE ELECTRONIC APPARATUS

CROSS-REFERENCE TO RELATED APPLICATIONS

This U.S. non-provisional patent application claims priority under 35 U.S.C. § 119 to Korean Patent Application No. 10-2023-0014333, filed on Feb. 2, 2023, the entire contents of which are hereby incorporated by reference.

TECHNICAL FIELD

The present disclosure relates to an electronic apparatus, and more particularly, to a foldable electronic apparatus.

DISCUSSION OF THE RELATED ART

Multimedia electronic apparatuses such as televisions, mobile phones, tablet computers, computer monitors, navigation system units, and game consoles may include a display panel for displaying images and an input sensor for sensing external inputs. Together, such devices are often referred to as touch-screen display units. With recent technological development, an electronic apparatus may include a flexible display panel, and various types of flexible electronic apparatuses capable of being deformed, folded, or rolled into a curved surface shape are being developed. A flexible electronic apparatus capable of being deformed into various shapes is easy to carry, and is capable of increasing user convenience. Stacked elements included in a flexible electronic apparatus should be easy to be folded or bent, and at the same time, to have sufficient mechanical properties, and to be lightweight to increase usability.

SUMMARY

An electronic apparatus includes a display module including a folding portion folded about a folding axis that extends in a first direction and first and second non-folding portions spaced apart from each other with the folding portion interposed therebetween in a second direction crossing the first direction. A support plate is disposed on a lower side of the display module and includes a plurality of openings defined in a region overlapping the folding portion. An adhesive layer is attached on an upper side of the support plate and overlaps the folding portion, the first non-folding portion, and the second non-folding portion. A cover is attached on a lower side of the support plate and overlaps at least the folding portion. A through portion passes through the cover along a through direction, and having a depth defined along a third direction which is perpendicular to first and second directions is defined on the cover. The through portion is connected to at least one of the openings.

The cover may include a base and an adhesive in contact with the base and the support plate.

The through direction of the through portion may be parallel to each of the first direction and the second direction.

The depth of the through portion may be less than the thickness of the cover.

The through portion may extend along the first direction, and the width of the through portion in the second direction may be less than the width of each of the openings in the second direction.

The through direction of the through portion may be equal to the third direction.

The area of the through portion may be less than the area of each of the openings.

The through portion may include a first through portion passing through the adhesive along a first through direction and overlapping at least one of the openings, and a second through portion passing through the base along a second through direction and overlapping at least a portion of the first through portion.

The first through portion and the second through portion may be entirely overlapped.

The first through direction and the second through direction may be different from each other.

The through direction may be provided in plural, and the through portion may include a first portion extending along a direction parallel to the first direction or the second direction, and a second portion crossing the first portion.

The display module may have a dumbbell shape when in a folded state.

The display module may further include a barrier layer having a high light absorption rate. The barrier layer may be in contact with the adhesive layer.

An electronic apparatus includes a display module including a folding portion folded about a folding axis extending along a first direction and first and second non-folding portions spaced apart from each other with the folding portion interposed therebetween in a second direction crossing the first direction. A support plate is disposed on a lower side of the display module and includes a plurality of openings defined in a region overlapping the folding portion. An adhesive layer is disposed on an upper side of the support plate and overlapping the folding portion, the first non-folding portion, and the second non-folding portion. A cover is disposed on a lower side of the support plate, and overlapping at least the folding portion. The cover includes an upper surface facing the support plate, a lower surface facing the upper surface, and a plurality of side surfaces connecting the upper surface and the lower surface to each other. A through portion passing through the upper surface and at least one other surface is defined on the cover. The through portion overlaps at least one of the openings.

The through portion may pass through the upper surface and the lower surface.

The through portion may further pass through at least one of the side surfaces.

The cover may include a base, and an adhesive disposed between the base and the support plate and attached to each thereof, wherein the upper surface may be an upper surface of the adhesive.

The through portion may pass through the adhesive.

The through portion may pass through the adhesive and the base.

The through portion may include a first through portion defined in the adhesive and a second through portion defined in the base. The first through portion and the second through portion may have different shapes from each other.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 7A to FIG. 7C are cross-sectional views of a display device according to an embodiment of the inventive concept;

FIG. 10A to FIG. 10D are plan views of a cover according to an embodiment of the inventive concept;

DETAILED DESCRIPTION

Figure 1A:
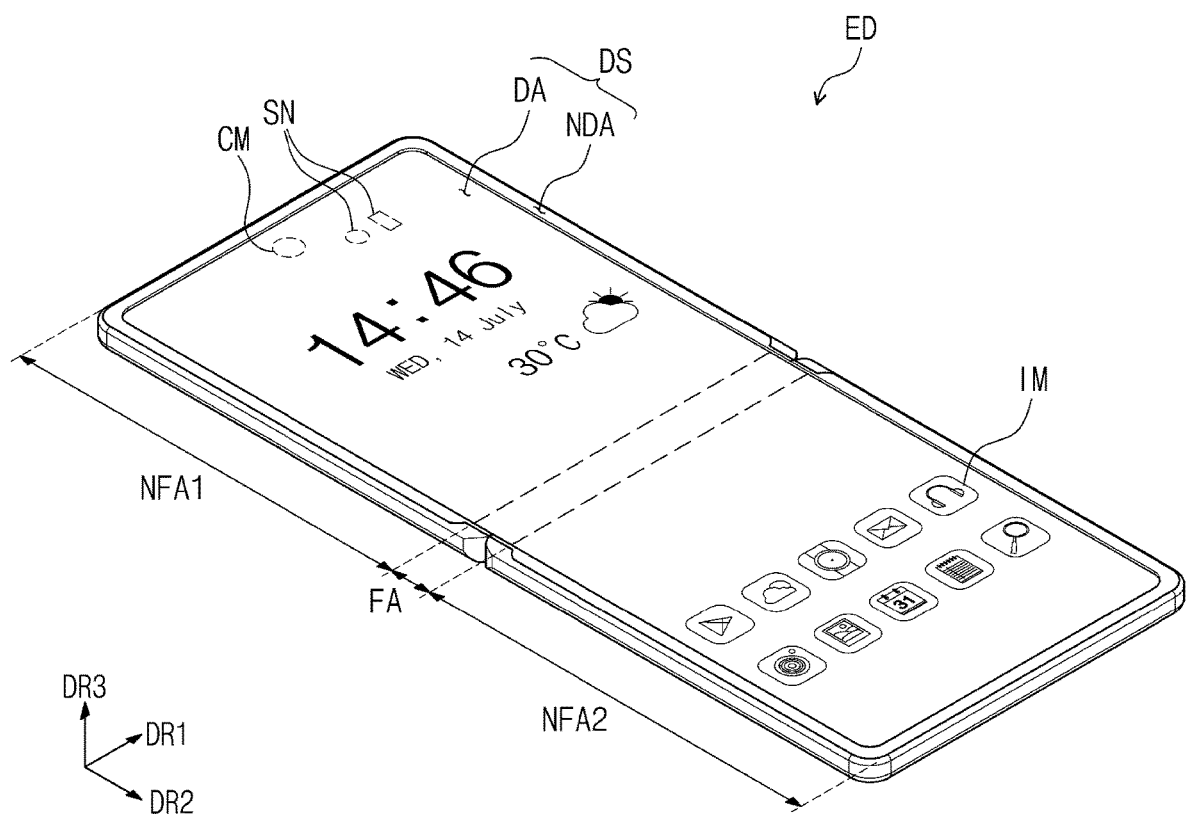
FIG. 1A and FIG. 1B are perspective views of an electronic apparatus according to an embodiment of the inventive concept.

In the present disclosure, when an element (or a region, a layer, a portion, etc.) is referred to as being "on," "connected to," or "coupled to" another element, it means that the element may be directly disposed on/connected to/coupled to the other element, or that a third element may be disposed therebetween.

Like reference numerals may refer to like elements throughout the disclosure and the figures. Also, in the drawings, the thickness, the ratio, and the dimensions of elements may be exaggerated for an effective description of technical contents. However, it is to be understood that the relative thicknesses, ratios, dimensions, etc. may be indicative of actual exemplary embodiments of the present invention even though the inventive concept is not necessarily limited thereto.

The term "and/or" includes any and all combinations of one or more of which associated elements may define.

It will be understood that, although the terms "first," "second," etc. may be used herein to describe various elements, these elements should not necessarily be limited by these terms. These terms are used to distinguish one element from another. For example, a first element may be referred to as a second element, and a second element may also be referred to as a first element in a similar manner without departing the scope of rights of the present invention. The terms of a singular form may include plural forms unless the context clearly indicates otherwise.

In addition, terms such as "below," "lower," "above," "upper," and the like are used to describe the relationship of components shown in the drawings. The terms are used as a relative concept and are described with reference to the direction indicated in the drawings.

It should be understood that the term "comprise," or "have" is intended to specify the presence of stated features, integers, steps, operations, elements, components, or combinations thereof in the disclosure, but do not preclude the presence or addition of one or more other features, integers, steps, operations, elements, components, or combinations thereof.

Hereinafter, embodiments of the inventive concept will be described with reference to the accompanying drawings.

Figure 1B:
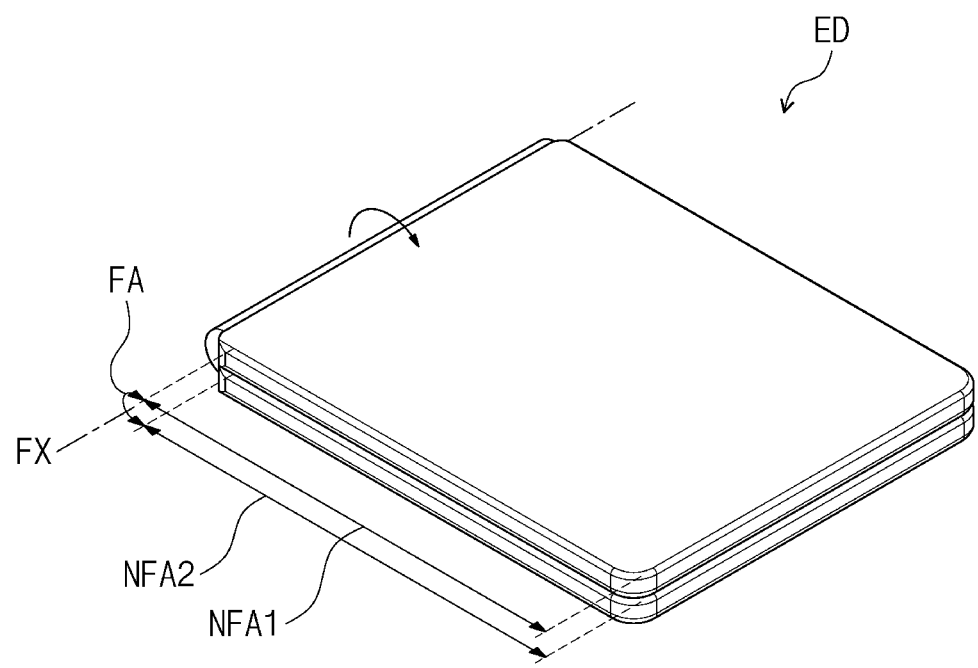
Figure 1B:
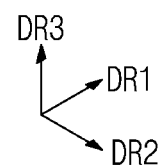

FIG. 1A and FIG. 1B are perspective views of an electronic apparatus according to an embodiment of the inventive concept. FIG. 1A illustrates an electronic apparatus ED in an unfolded state, and FIG. 1B illustrates the electronic apparatus ED in a folded state. Hereinafter, the inventive concept will be described with reference to FIG. 1A and FIG. 1B.

Referring to FIG. 1A, the electronic apparatus ED may have a rectangular shape including a pair of short sides, each extended along a first direction DR1, and a pair of long sides, each extended along a second direction DR2 which crosses the first direction DR1. The thickness of the electronic apparatus ED may be defined along a third direction DR3 crossing the first direction DR1 and the second direction DR2. However, this is exemplarily illustrated, and the planar shape of the electronic apparatus ED may vary on a plane defined by the first direction DR1 and the second direction DR2, and is not necessarily limited to any one embodiment.

Hereinafter, the third direction DR3 may be a direction substantially perpendicularly crossing the plane defined by the first direction DR1 and the second direction DR2. In addition, in the present disclosure, "when viewed on a plane" or "in a plan view" may be defined as a state of being viewed in the third direction DR3. In addition, in the present disclosure, "overlap" may refer to a state in which components are disposed overlapping each other when viewed on a plane.

An upper surface of the electronic apparatus ED may be defined as a display surface DS, and may have the plane defined by the first direction DR1 and the second direction DR2. Images IM generated in the electronic apparatus ED may be provided to a user through the display surface DS.

The display surface DS may include a display region DA and a non-display region NDA at least partially surrounding the display region DA. The display region DA may display an image, and the non-display region NDA might not display an image. The non-display region NDA at least partially surrounds the display region DA, and may define an edge of the electronic apparatus ED printed in a predetermined color.

The electronic apparatus ED may include a plurality of sensors SN and at least one camera module CM. The sensors SN and the camera module CM may be adjacent to the edge of electronic apparatus ED. The sensors SN and the camera module CM may be disposed in the display region DA adjacent to the non-display region NDA. The sensors SN and the camera module CM may be disposed in a first non-folding region NFA1, but positions at which the sensors SN and the camera module CM are disposed are not necessarily limited thereto.

Illustratively, the sensors SN may be near-illumination sensors, but the type of the sensors SN is not necessarily limited thereto. The camera module CM may capture an external image.

As illustrated in FIG. 1A and FIG. 1B, the electronic apparatus ED may be flexible. The electronic apparatus ED may be folded about a folding axis FX. In the present embodiment, the folding axis FX is extended along the first direction DR1, for example, a short side of the electronic apparatus ED, and being disposed on an upper side of the electronic apparatus ED. However, this is only exemplary, and the folding axis FX may be extended along a direction different from the first direction DR1, for example, the second direction DR2, or to be disposed on a lower side of the electronic apparatus ED, and is not necessarily limited to any one embodiment.

The electronic apparatus ED may include a folding region FA and a plurality of non-folding regions NFA1 and NFA2. The non-folding regions NFA1 and NFA2 may include a first non-folding region NFA1 and a second non-folding region NFA2. The folding region FA may be disposed between the first non-folding region NFA1 and the second non-folding region NFA2. The first non-folding region NFA1, the folding region FA, and the second non-folding region NFA2 may be arranged in the first direction DR1. The first non-folding region NFA1 and the second non-folding region NFA2 may be spaced apart from each other in the first direction DR1 with the folding region FA interposed therebetween. In the present embodiment, the first non-folding region NFA1, the folding region FA, and the second non-folding region NFA2 may be sequentially arranged along the second direction DR2. In the present embodiment, one folding region and two non-folding regions are illustrated, but this is only exemplarily illustrated, and the number of folding regions or the number of non-folding regions may be variously changed, and may be variously designed according to the number of folding axes.

As illustrated in FIG. 1B, the electronic apparatus ED may be in-folded such that the display surface DS is not exposed to the outside. Accordingly, the electronic apparatus ED in a folded state may protect the display surface DS. However, this is only exemplarily illustrated, and the electronic apparatus ED may be out-folded such that the display surface DS is exposed to the outside. Accordingly, the electronic apparatus ED even in a folded state, information may be provided to a user through the display surface DS. The electronic apparatus ED according to the inventive concept may be provided in various embodiment, and is not necessarily limited to any one embodiment.

Figure 2A:
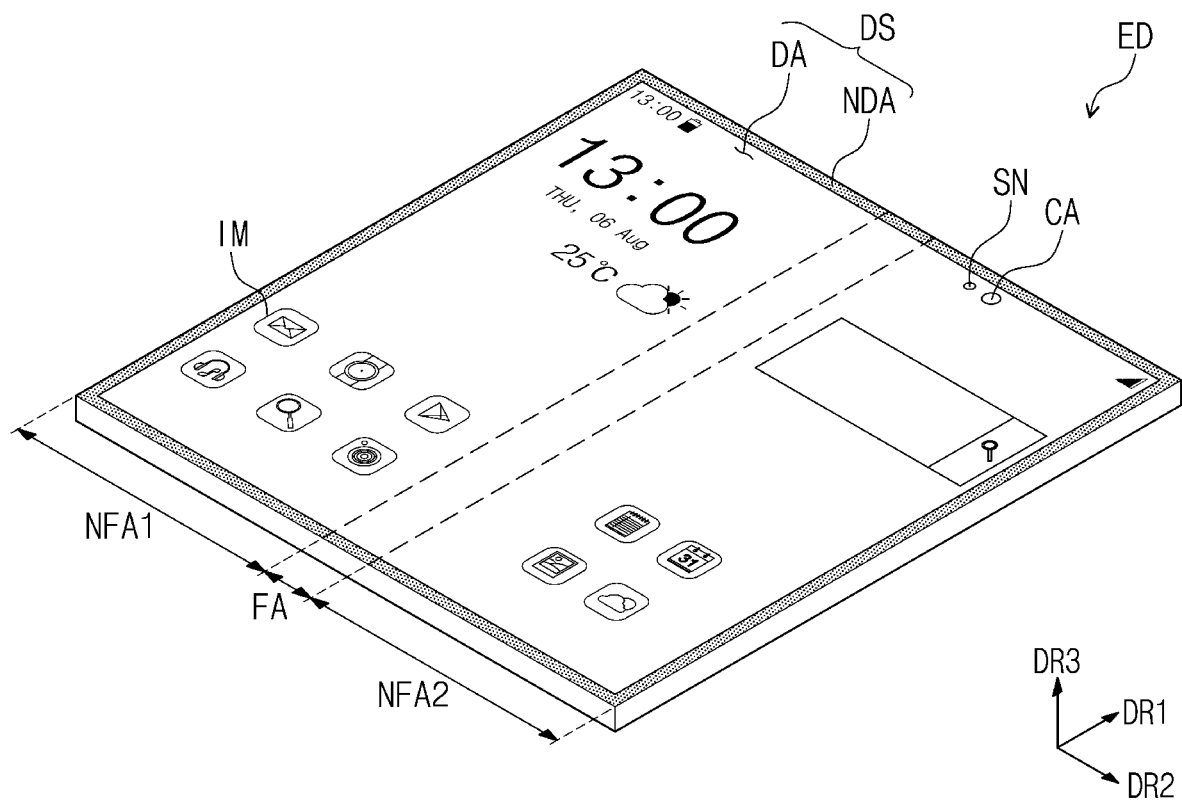
FIG. 2A and FIG. 2B are perspective views of an electronic apparatus according to an embodiment of the inventive concept.
Figure 2B:
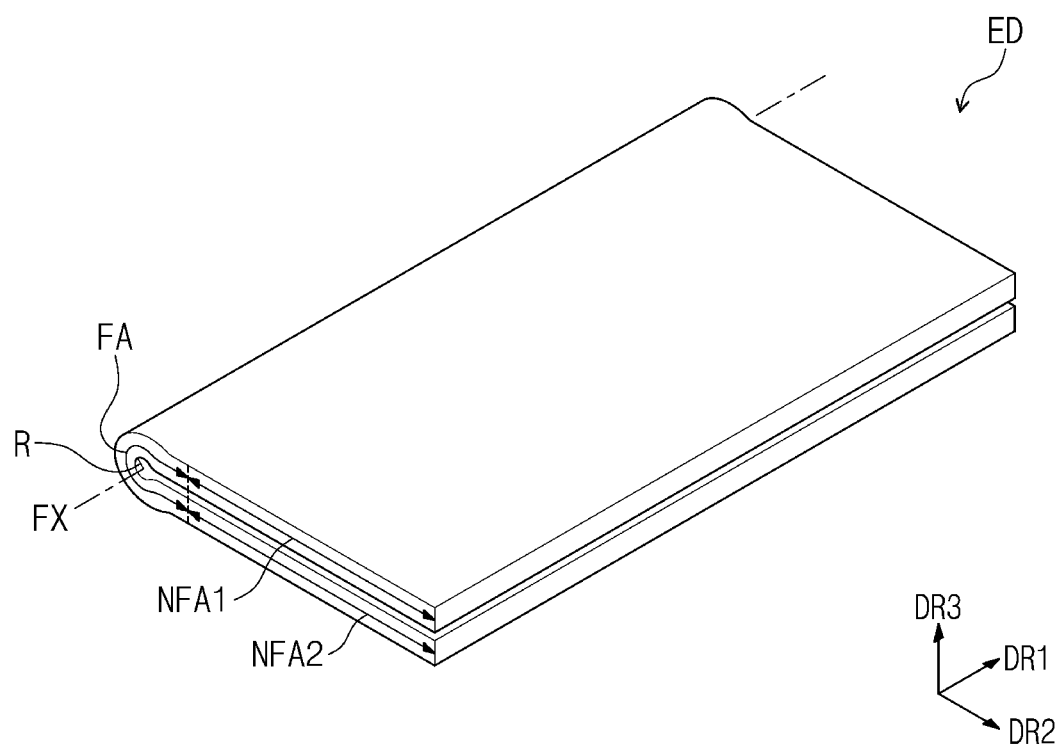

FIG. 2A and FIG. 2B are perspective views of an electronic apparatus according to an embodiment of the inventive concept. FIG. 2A illustrates an electronic apparatus ED-1 in an unfolded state, and FIG. 2B illustrates the electronic apparatus ED-1 in a folded state. Hereinafter, the inventive concept will be described with reference to FIG. 2A and FIG. 2B. The same reference numerals may be given to the same components as those described with reference to FIG. 1A and FIG. 1B, and to the extent that a description of an element is omitted, it may be assumed that the element is at least similar to corresponding elements that have been described elsewhere within the present disclosure.

The electronic apparatus ED-1 may be folded about a folding axis FX-1. In the present embodiment, the folding axis FX-1 is defined as being extended along the second direction DR2 and being disposed on an upper side of the electronic apparatus ED-1. Accordingly, the electronic apparatus ED-1 may be in-folded along the folding axis FX-1, and in a folded state, the electronic apparatus ED-1 may have a rectangular shape which has a pair of long sides extended along the first direction DR1 and a pair of short sides extended along the second direction DR2.

As illustrated in FIG. 2B, when folded, the electronic apparatus ED-1 may have a dumbbell shape having a predetermined curvature radius R. Accordingly, even when completely folded, the electronic apparatus ED-1 may maintain the predetermined curvature radius R, so that folding stress applied to the folding portion FA may be reduced, and the reliability of the electronic apparatus ED-1 may be increased.

Figure 3A:
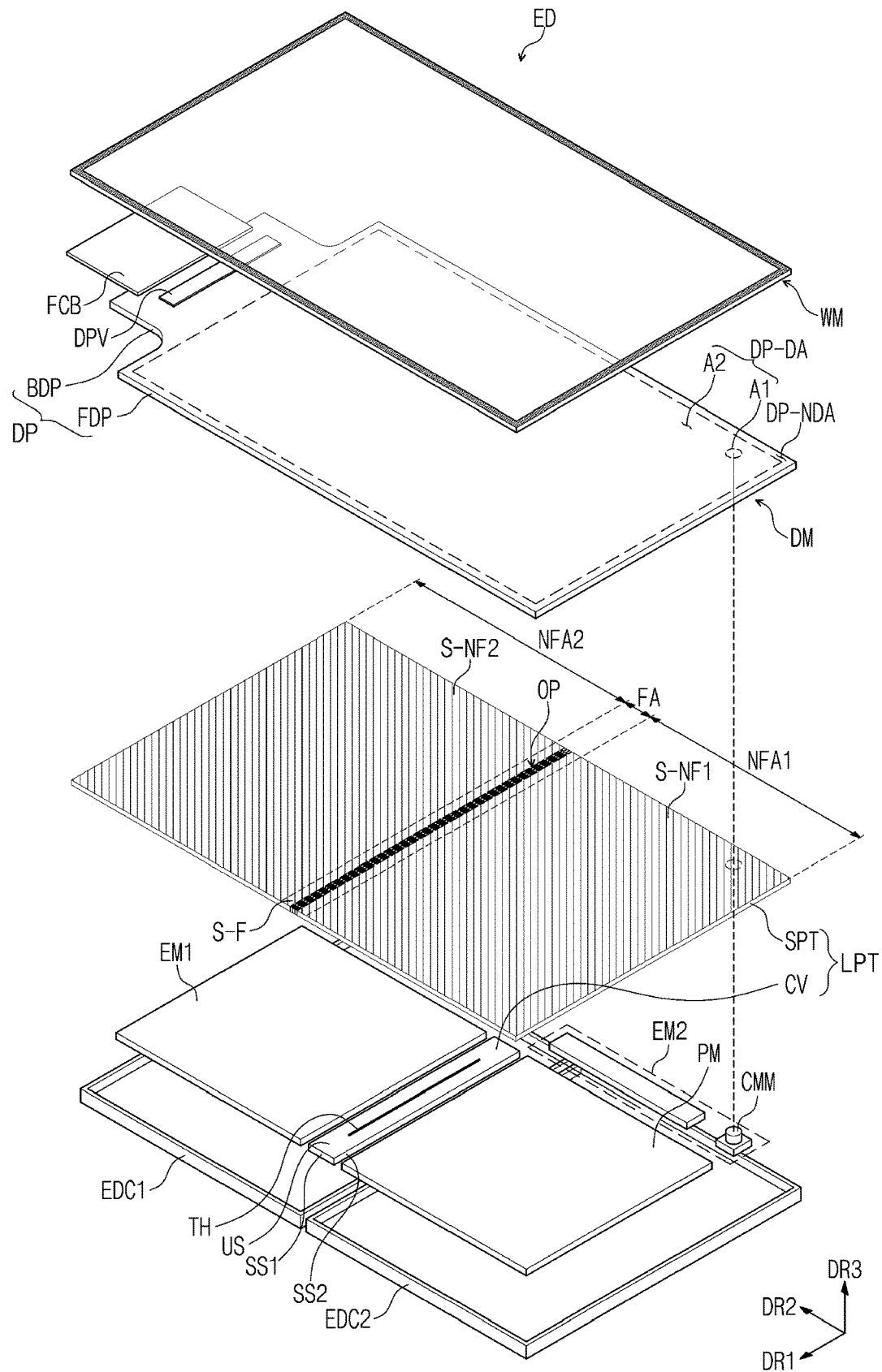
FIG. 3A is an exploded perspective view of an electronic apparatus according to an embodiment of the inventive concept.
Figure 3B:
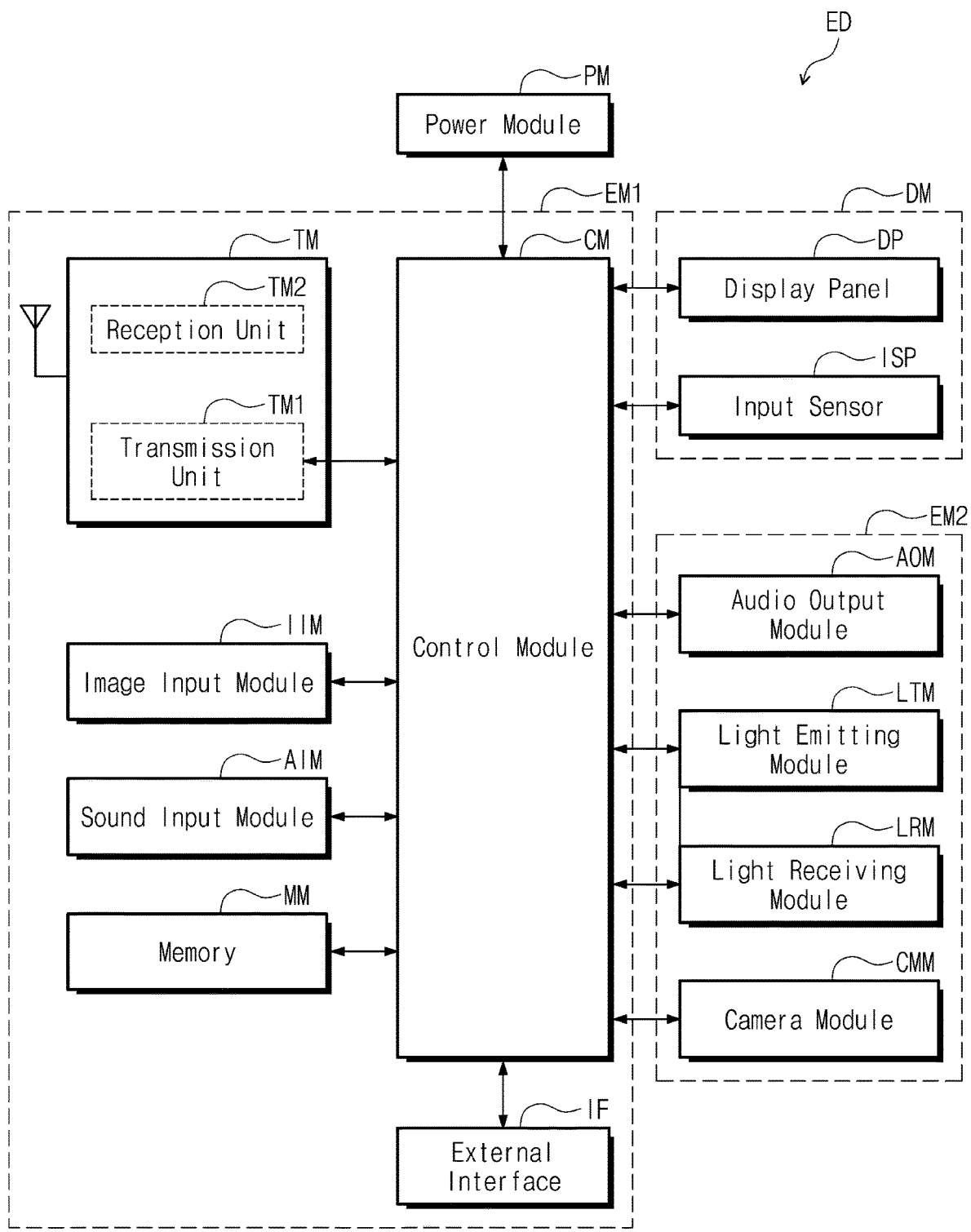
FIG. 3B is a block diagram of an electronic apparatus according to an embodiment of the inventive concept.

FIG. 3A is an exploded perspective view of an electronic apparatus according to an embodiment of the inventive concept. FIG. 3B is a block diagram of an electronic apparatus according to an embodiment of the inventive concept. Hereinafter, the inventive concept will be described with reference to FIG. 3A and FIG. 3B.

Referring to FIG. 3A, the electronic apparatus ED may include a display device DD, a first electronic module EM1, a second electronic module EM2, a power module PM, and cases EDC1 and EDC2. The electronic device ED may further include an instrument structure (e.g., a hinge) for controlling a folding operation of the display device DD.

The display device DD may generate an image IM (see FIG. 1A). The display device DD may include a window module WM, a display module DM, and a lower portion LPT. In the present embodiment, the window module WM and the display module DM may be flexible. The window module WM and the display module DM may include a first non-folding region NFA1, a folding region FA, and a second non-folding region NFA2. As the folding region FA is folded about a folding axis, the window module WM and the display module DM may be folded. In the present embodiment, for ease of description, the first non-folding region NFA1, the folding region FA, and the second non-folding region NFA2 are exemplarily illustrated in a lower portion LPT.

The window module WM may provide a front surface of the electronic apparatus ED. For example, a front surface of the window module WM may correspond to the above-described front surface of the electronic apparatus ED. The window module WM may transmit light generated in the display module DM and provide the light to a user. The window module WM may be disposed on the display module DM and have a shape corresponding to the shape of the display module DM. The window module WM may cover the entire outer side of the display module DM to protect the display module DM from external impacts and scratches.

The display module DM may include a display panel DP, and the display module DM may further include a plurality of components disposed on an upper side and a lower side of the display panel DP. According to an embodiment, the display module DM may further include an electrical component such as an input sensor IS, or an optical element such as an anti-reflection element. A detailed stacked structure of the display module DM will be described in detail later.

The display panel DP may display an image in response to an electrical signal. The display panel DP according to an embodiment may be a light emitting type display panel, but is not necessarily particularly limited thereto. For example, the display panel DP may be an organic light emitting display panel, an inorganic light emitting display panel, or a quantum dot light emitting display panel. A light emitting layer of the organic light emitting display panel may include an organic light emitting material, and a light emitting layer of the inorganic light emitting display panel may include an inorganic light emitting material. A light emitting layer of the quantum dot light emitting display panel may include a quantum dot, a quantum load, and the like. Hereinafter, the display panel DP will be described as an organic light emitting display panel.

The input sensor IS may sense an external input applied from the outside of the electronic apparatus ED, and obtain coordinate information of the external input. The input sensor IS may be driven in various ways, such as a capacitive method, a resistive film method, an infrared method, or a pressure method, and is not necessarily limited to any one thereof.

Referring to FIG. 3A, the display module DM may include a display region DP-DA in which an image provided by the display panel DP is displayed and a non-display region DP-NDA in which an image is not displayed. The display region DP-DA of the display module DM may correspond to the display region DA of the electronic apparatus ED, and the non-display region DP-NDA of the display module DM may correspond to the peripheral region NDA of the electronic apparatus ED.

The display region DP-DA of the display module DM may include a first region A1 and a second region A2. In an embodiment, the second region A2 may at least partially surround the first region A1. However, the embodiment of the inventive concept is not necessarily limited thereto, and the second region A2 may surround only one portion of the first region A1. In the present embodiment, the first region A1 is illustrated as being a region having a circular shape, but the embodiment of the inventive concept is not necessarily limited thereto, and the first region A1 may be defined in various shapes such as oval, polygonal, and atypical shapes on a plane. The first region A1 may be referred to as a component region, and the second region A2 may be referred to as a main display region.

The first region A1 may be a region overlapping at least one of the second electronic modules EM2. For example, in the present embodiment, the first region A1 may be a region overlapping a camera module CMM. The first region A1 may have a higher light transmittance rate than the second region A2. In addition, the resolution of the first region A1 may be lower than the resolution of the second region A2. Light passing through the first region A1 may be transmitted to the camera module CMM, or a signal output from the camera module CMM may pass through the first region A1. However, this is exemplarily described, and the first region A1 may be a region overlapping another component among the second electronic modules EM2, for example, a light receiving module LRM or other components, or may be omitted, and is not necessarily limited to any one embodiment. A detailed description of the first region A1 will be described later.

The display module DM may include a data driver DIC disposed in the non-display region NDA. The data driver DIC may include a data driving circuit for driving elements.

The data driver DIC may be manufactured in the form of an integrated circuit chip and mounted in the non-display region DP-NDA of the display module DM. The display module DM may further include a circuit board FCB connected to the non-display region DP-NDA. In an embodiment, the data driver DIC may be mounted on the circuit board FCB.

The display device DD may further include a digitizer. The digitizer may be disposed on a lower side of the display module DM. The digitizer may sense an external input different from an external input sensed by the input sensor IS included in the display module DM. For example, the input sensor IS may sense a touch using a user's body, and the digitizer may sense a contact of an electromagnetic pen. However, the embodiment is not necessarily limited thereto.

The lower portion LPT is disposed on the lower side of the display module DM and supports the display panel DM. The lower portion LPT may include a support plate SPT and a cover CV. The support plate SPT (hereinafter, a first support plate) may overlap the folding region FA, the first non-folding region NFA1, and the second non-folding region NFA2 on a plane. Accordingly, the first support plate SPT may include a first support portion S-NF1, a second support portion S-NF2, and a folding portion S-F. The first support portion S-NF1 and the second support portion S-NF2 are spaced apart from each other in the second direction DR2 with the folding portion S-F interposed therebetween.

The first support portion S-NF1 overlaps the first non-folding region NFA1 and supports the first non-folding region NFA1. The second support portion S-NF2 overlaps the second non-folding region NFA2 and supports the second non-folding region NFA2.

The folding portion S-F overlaps the folding region FA and supports the folding region FA. The folding portion S-F is folded to correspond to the folding region FA of the electronic apparatus ED. In the folding portion S-FA, a plurality of holes OP passing therethrough may be defined. Each of the holes OP passes through the first support plate SPT along a thickness direction DR3 (hereinafter, the third direction). The shape of the folding portion S-F may be easily deformed when folded due to the holes DP. The folding portion S-F may include a different material from that of the first support portion S-NF1 and that of the second support portion S-NF2. For example, the folding portion S-F may include a single metal or alloy. Accordingly, even in a folded state, the folding portion S-F may stably protect the folding region FA of the display module DM. However, this is exemplarily described, and the folding portion S-F may be formed of the same material as that of the first support portion S-NF1 or that of the second support portion S-NF2, and is not necessarily limited to any one embodiment.

The cover CV is disposed on a lower side of the first support plate SPT. The cover CV may be in contact with the first support plate SPT. For example, the cover CV may be disposed overlapping the folding region FA, and may be attached to a lower side of the folding portion S-F of the first support plate SPT.

A predetermined through portion TH may be defined on the cover CV. The through portion TH passes through an upper surface US of the cover CV and a surface other than the upper surface along a predetermined through direction. In the present embodiment, the through portion TH is illustrated as an example passing through the upper surface US and a rear surface. For example, the through portion TH may be a through hole passing through the cover CV along the third direction DR3. However, this is only exemplarily illustrated, and the through direction may be variously designed. For example, the through portion TH may pass through the upper surface US and a first side surface SS1 of the cover CV. Alternatively, the through portion TH may pass through the upper surface US and a second side surface SS2. Alternatively, the through portion TH may pass through the upper surface US and a lower surface. Alternatively, the through portion TH may pass through all of the upper surface US, the first side surface SS1, and a third side surface facing the first side surface. Here, the through portion TH may have the shape of a groove recessed from the upper surface US, may be a through hole, or may include various embodiments such as a cut portion and the like, and may be expressed in various terms.

The through direction may be a direction parallel to the first direction DR1 and the second direction DR2. For example, on a plane defined by the first direction DR1 and the second direction DR2, the through direction may be the same as the first direction DR1, the same as the second direction DR2, or a direction crossing the first direction DR1 or the second direction DR2. Alternatively, the through direction may be a direction parallel to the third direction DR3 or crossing the third direction DR3. For example, the through direction may have various directions as long as it can pass through at least two surfaces of the cover CV, and is not necessarily limited to any one embodiment.

The through portion TH overlaps at least one of the openings OP on a plane. The through portion TH may communicate with (e.g., be connected to) an overlapping opening among the openings OP. The cover CV includes at least one through portion TH, so that the overlapping opening is not sealed. Accordingly, during a process of attaching the display module DM and the lower portion LPT, it is possible to prevent the display module DM from being deformed by vacuum. A detailed description thereof will be described later.

The power module PM, the first electronic module EM1, and the second electronic module EM2 may be disposed below the display module DM. In an embodiment, the power module PM, the first electronic module EM1, and the second electronic module EM2 may be disposed in a lower portion of a digitizer DGT. The power module PM and the first and second electronic modules EM1 and EM2 may be connected to each other through a separate flexible circuit board. The power module PM supplies power necessary for the overall operation of the electronic apparatus ED. The power module PM may include a typical battery module.

The first electronic module EM1 and the second electronic module EM2 include various functional modules for operating the electronic apparatus ED. Each of the first electronic module EM1 and the second electronic module EM2 may be directly mounted on a mother board electrically connected to the display panel DP, or may be mounted on a separate substrate and electrically connected to the mother board through a connector and the like.

The first electronic module EM1 may include a control module CM, a wireless communication module TM, an image input module IIM, a sound input module AIM, a memory MM, and an external interface IF.

The control module CM may control the overall operation of the electronic apparatus ED. The control module CM may include at least one microprocessor. For example, the control module CM may activate or deactivate the display module DM in accordance with a user's input. In addition, the control module CM may control other modules such as a sensing module SM, the image input module IIM, or the sound input module AIM in accordance with a user's input.

The wireless communication module TM may communicate with an external electronic device via a first network (e.g., a short-range communication network such as Bluetooth, WiFi direct, or an infrared data association (IrDA)) or a second network (e.g., a long-range communication network such as a cellular network, the Internet, or a computer network (e.g., a LAN or WAN)). Communication modules included in the wireless communication module TM may be integrated into one component (e.g., a single chip), or may be implemented as a plurality of components (e.g., a plurality of chips) separated from each other. The wireless communication module TM may transmit/receive voice signals using a general communication line. The wireless communication module TM may include a transmission unit TM1 for modulating and then transmitting a signal to be transmitted, and a reception unit TM2 for demodulating a received signal.

The image input module IIM may process an image signal and convert the processed image signal into image data displayable on the display panel DP. The sound input module AIM may receive an external sound signal through a microphone in a recording mode, a voice recognition mode, and the like, and convert the received external sound signal into electrical voice data.

The external interface IF may include a connector capable of physically connecting the electronic apparatus ED and the external electronic device. For example, the external interface IF may serve as an interface which is connected to an external charger, a wired/wireless data port, a card socket (e.g., a memory card, a SIM/UIM card), and the like.

The second electronic module EM2 may include a sound output module AOM, a light emitting module LTM, a light receiving module LRM, a camera module CMM, and the like.

The sound output module AOM may convert sound data received from the wireless communication module TM or sound data stored in the memory MM and output the converted sound data to the outside.

The light emitting module LTM may generate and output light. In an embodiment, the light emitting module LTM may output infrared rays. The light emitting module LTM may include an LED element. The light emitting module LM may sense infrared rays. The light receiving module LRM may be activated when infrared rays of a predetermined level or higher is sensed. The light receiving module LRM may include a CMOS sensor. After infrared light generated in the light emitting module LTM is output, the infrared light is reflected by an external object (e.g., a user's finger or face), and the reflected infrared light may be incident on the light receiving module LRM.

The camera module CMM may capture still images and moving images. In an embodiment, the camera module CMM may be provided in plural. As described above, the camera module CMM may overlap the first region A1, and may receive an optical signal through the first region A1. For example, the camera module CMM may capture an external image by receiving natural light passing through the first region A1 from the outside.

The window module WM and the cases EDC1 and EDC2 may be coupled to each other so as to configure the appearance of the electronic apparatus ED, and may provide an internal space capable of accommodating components of the electronic apparatus ED. For example, the cases EDC1 and EDC2 may accommodate the display module DM, the first and second electronic modules EM1 and EM2, and the power module PM, and may protect the accommodated components of the electronic apparatus ED. The electronic apparatus ED may further include a hinge structure for connecting the cases EDC1 and EDC2.

Figure 4A:
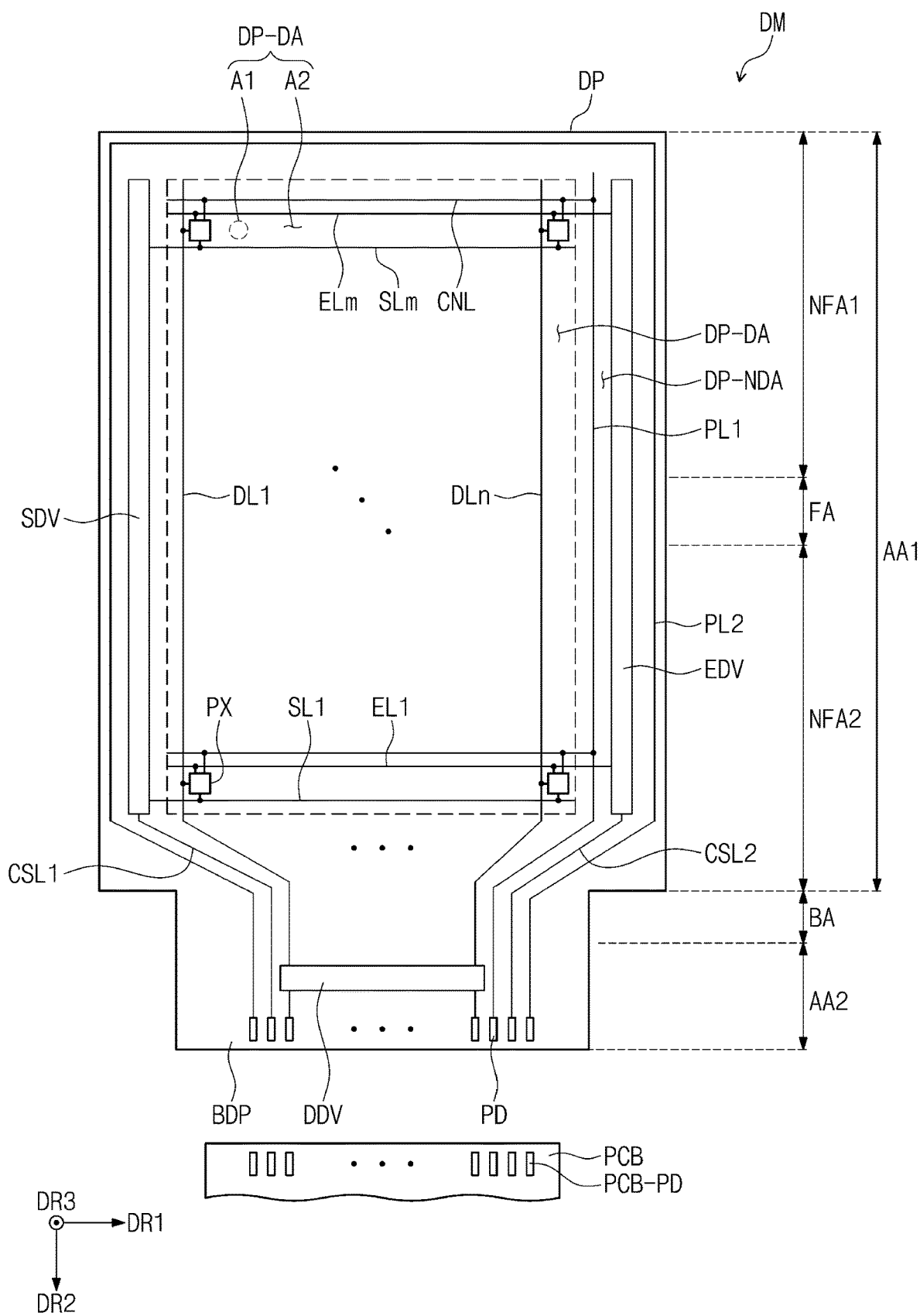
FIG. 4A is a plan view of a display device according to an embodiment of the inventive concept.
Figure 4B:
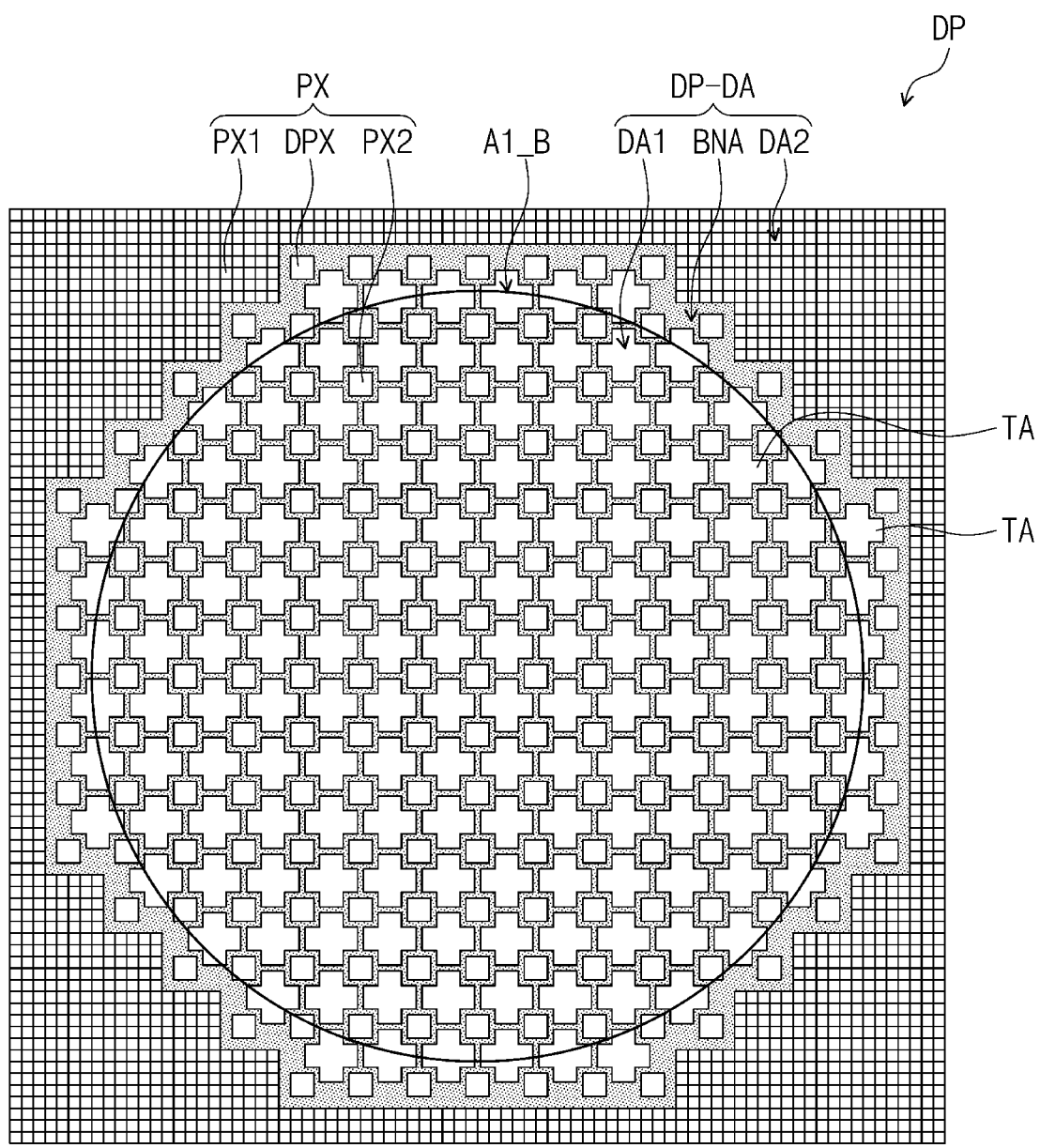
FIG. 4B is a plan view illustrating a portion of a display module.
Figure 4C:
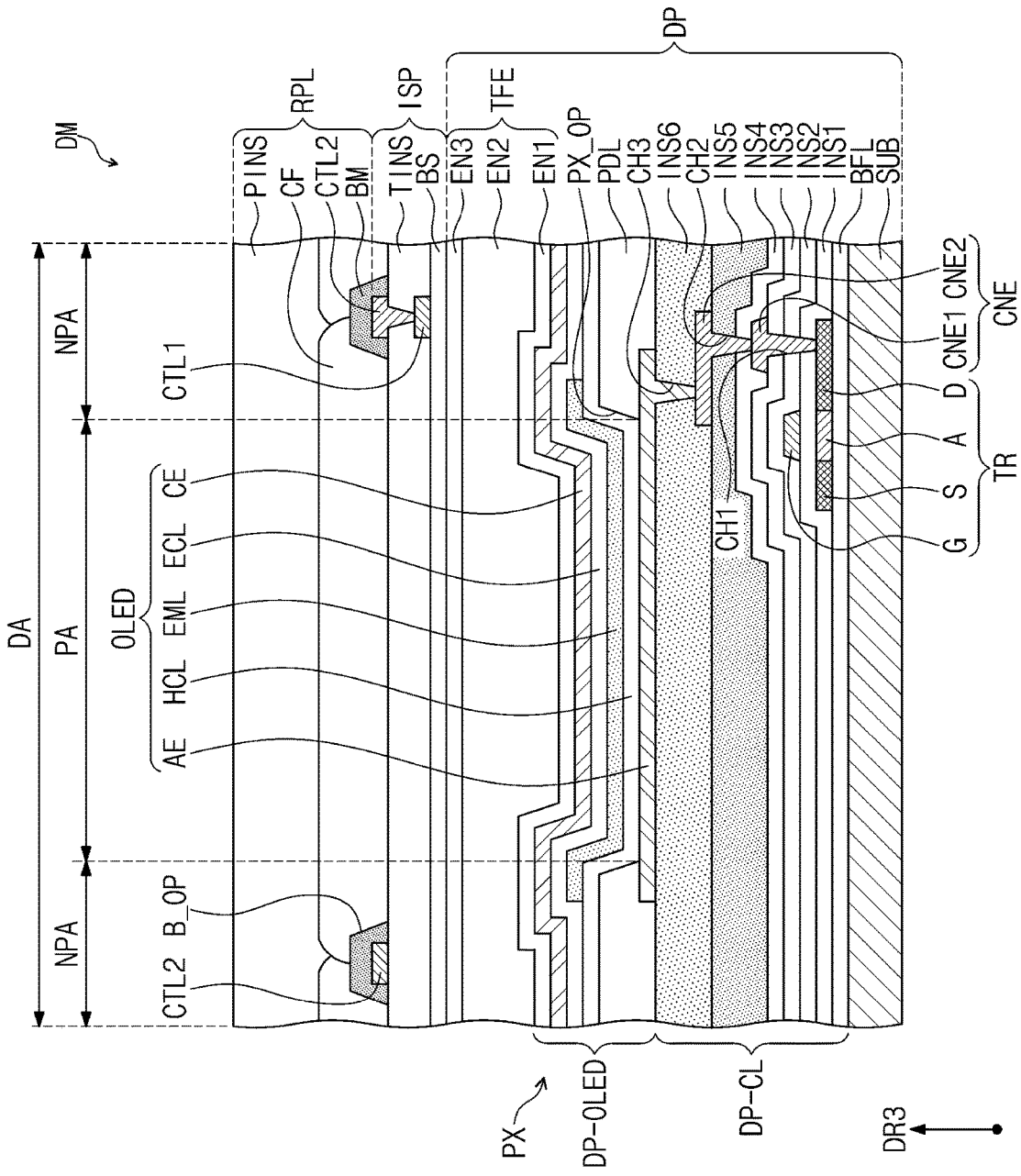
FIG. 4C is a cross-sectional view illustrating a portion of a display panel.

FIG. 4A is a plan view of a display device according to an embodiment of the inventive concept. FIG. 4B is a plan view illustrating a portion of a display module. FIG. 4C is a cross-sectional view illustrating a portion of a display panel. Hereinafter, with reference to FIG. 4A to FIG. 4C, the inventive concept will be described. The same reference numerals may be given to the same components as those described with reference to FIG. 1A to FIG. 3B, and to the extent that a description of an element is omitted, it may be assumed that the element is at least similar to corresponding elements that have been described elsewhere within the present disclosure.

Referring to FIG. 4A, a display module DM may include a display panel DP, a scan driver SDV, a data driver DDV, and an emission driver EDV.

The display panel DP may include a first region AA1, a second region AA2, and a bending region BA between the first region AA1 and the second region AA2. The bending region BA may extend in the first direction DR1, and the first region AA1, the bending region BA, and the second region AA2 may be arranged in the second direction DR2.

The first region AA1 may include a display region DA and a non-display region NDA around the display region DA. The non-display region NDA may at least partially surround the display region DA. The display region DA may be a region which displays an image, and the non-display region NDA may be a region which does not display an image. The second region AA2 and the bending region BA may be regions which do not display an image.

The first region AA1 may include, when viewed in the first direction DR1, a first non-folding region NFA1, a second non-folding region NFA2, and a folding region FA between the first non-folding region NFA1 and the second non-folding region NFA2. Since the folding region FA is folded about the folding axis FX described above, the display panel DP may be folded. First and second hole regions HA1 and HA2 may be defined in the display region DA and the second non-folding region NFA2.

The display panel DP may include a plurality of pixels PX, a plurality of scan lines SL1 to SLm, a plurality of data lines DL1 to DLn, a plurality of emission lines EL1 to ELm, first and second control lines CSL1 and CSL2, a power line PL, a plurality of connection lines CNL, and a plurality of pads PD. Here m and n are positive integers. The pixels PX are disposed in the display region DA, and may be connected to the scan lines SL1 to SLm, the data lines DL1 to DLn, and the emission lines EL1 to ELm.

The scan driver SDV and the emission driver EDV may be disposed in the non-display region NDA. The scan driver SDV and the emission driver EDV may be disposed in the non-display region NDA adjacent to each of both sides of the first region AA1 which are opposite to each other in the first direction DR1. The data driver DDV may be disposed in the second region AA2. The data driver DDV may be manufactured in the form of an integrated circuit chip and mounted on the second region AA2.

The scan lines SL1 to SLm may be extended in the first direction DR1 and connected to the scan driver SDV. The data lines DL1 to DLn are extended in the second direction DR2, and may be connected to the data driver DDV via the bending region BA. The emission lines EL1 to ELm may be extended in the first direction DR1 and connected to the emission driver EDV.

The power line PL may be extended in the second direction DR2 and disposed in the non-display region NDA.

The power line PL may be disposed between the display region DA and the emission driver EDV, but is not necessarily limited thereto, and the power line PL may be disposed between the display region DA and the scan driver SDV.

The power line PL may be extended to the second region AA2 via the bending region BA. When viewed on a plane, the power line PL may be extended toward a lower end of the second region AA2. The power line PL may receive a driving voltage.

The connection lines CNL may be extended in the first direction DR1 and arranged in the second direction DR2. The connection lines CNL may be connected to the power line PL and the pixels PX. The driving voltage may be applied to the pixels PX through the power line PL and the connection lines CNL connected to each other.

The first control line CSL1 is connected to the scan driver SDV, and may be extended toward the lower end of the second region AA2 via the bending region BA. The second control line CSL2 is connected to the emission driver EDV, and may be extended toward the lower end of the second region AA2 via the bending region BA. The data driver DDV may be disposed between the first control line CSL1 and the second control line CSL2.

When viewed on a plane, the pads PD may be disposed adjacent to the lower end of the second region AA2. The data driver DDV, the power line PL, the first control line CSL1, and the second control line CSL2 may be connected to the pads PD.

The data lines DL1 to DLn may be connected to corresponding pads PD through the data driver DDV. For example, the data lines DL1 to DLn may be connected to the data driver DDV, and the data driver DDV may be connected to the pads PD respectively corresponding to the data lines DL1 to DLn.

A printed circuit board may be connected to the pads PD, and a timing controller and a voltage generator may be disposed on the printed circuit board. The timing controller may be manufactured as an integrated circuit chip and mounted on the printed circuit board. The timing controller and the voltage generator may be connected to the pads PD through the printed circuit board.

The timing controller may control the operation of the scan driver SDV, the data driver DDV, and the emission driver EDV. The timing controller may generate a scan control signal, a data control signal, and an emission control signal in response to control signals received from the outside. The voltage generator may generate a driving voltage.

The scan control signal may be provided to the scan driver SDV through the first control line CSL1. The emission control signal may be provided to the emission driver EDV through the second control line CSL2. The data control signal may be provided to the data driver DDV. The timing controller receives image signals from the outside, and may convert the data format of the image signals to match interface specifications with the data driver DDV and provide the image signals with converted data format to the data driver DDV.

The scan driver SDV may generate a plurality of scan signals in response to the scan control signal. The scan signals may be applied to the pixels PX through the scan lines SL1 to SLm. The scan signals may be sequentially applied to the pixels PX.

The data driver DDV may generate a plurality of data voltages corresponding to the image signals in response to the data control signal. The data voltages may be applied to the pixels PX through the data lines DL1 to DLn. The emission driver EDV may generate a plurality of emission signals in response to the emission control signal. The emission signals may be applied to the pixels PX through the emission lines EL1 to ELm.

The pixels PX may be provided with the data voltages in response to the scan signals. The pixels PX may display an image by emitting light of luminance corresponding to the data voltages in response to the emission signals. The emission duration of the pixels PX may be controlled by the emission signals.

FIG. 4B illustrates an enlarged region in which the first region A1 is disposed. Referring to FIG. 4B, the display region DA may include a first display region DA1, a second display region DA2 around the first display region DA1, and a boundary region BNA between the first display region DA1 and the second display region DA2. For ease of description, an outer boundary A1B of the camera module CMM (see FIG. 3A) is illustrated with a solid line. The first display region DA1 may correspond to the first region A1 described above, and the second display region DA2 may correspond to the second region A2.

The pixels PX may include a plurality of first pixels PX1, a plurality of second pixels PX2, and a plurality of dummy pixels DPX. The first pixels PX1 may be disposed in the second display region DA2. The second pixels PX2 may be disposed in the first display region DA1. The dummy pixels DPX may be disposed in the boundary region BNA. Illustratively, the boundary region BNA adjacent to the second display region DA2 may schematically have an octagonal shape. However, the shape of the boundary region BNA is not necessarily limited thereto.

Illustratively, the second pixels PX2 may be arranged in the first direction DR1 and the second direction DR2 in the first display region DA1, but the arrangement form of the second pixels PX2 is not necessarily limited thereto. The dummy pixels DPX may be disposed to surround the first display region DA1 along the boundary region BNA. Each of the second pixels PX2 and the dummy pixels DPX may include a plurality of sub-pixels displaying red, green, and blue colors.

The first display region DA1 may display an image by the second pixels PX2. The second display region DA2 may display an image by the first display pixels PX1. The boundary region BNA may display an image by the dummy pixels DPX. Accordingly, a predetermined image may be displayed in the display region DA by light generated in the first pixels PX1, the second pixels PX2, and the dummy pixels DPX.

The display panel DP may include a plurality of transmission regions TA overlapping the first hole region HA1. The transmission regions TA may be disposed between the second pixels PX2. In addition, the transmission regions TA may be disposed between the dummy pixels DPX and the second pixels PX2 adjacent to the dummy pixels DPX.

Illustratively, the transmission regions TA may have a cross shape, but the shape of the transmission regions TA is not necessarily limited thereto. The transmission regions TA may be disposed around each of the second pixels PX2. The transmission regions TA may be disposed in a first diagonal direction DDR1 and a second diagonal direction DDR2 with respect to each of the second pixels PX2.

The first diagonal direction DDR1 may be defined as a direction crossing the first and second directions DR1 and DR2 on a plane defined by the first and second directions DR1 and DR2. The second diagonal direction DDR2 may be defined as a direction crossing the first diagonal direction DDR1 on a plane defined by the first and second directions DR1 and DR2. Illustratively, the first and second directions DR1 and DR2 may vertically cross each other, and the first and second diagonal directions DDR1 and DDR2 may vertically cross each other.

The transmission regions TA may have a higher light transmittance rate than the first and second pixels PX1 and PX2 and the dummy pixels DPX. Light (e.g., the aforementioned optical signal) transmitted the transmission regions TA may be provided to the camera module CMM (see FIG. 3A) disposed below the first display region DA1. For example, the light transmittance rate of the first display region DA1 or the first region A1 may be increased by the transmission regions TA, and light may be provided to the camera module CMM through the first display region DA1. Therefore, the first display region DA1 displays an image, and additionally, light transmitted the first display region DA1 may be provided to the camera module CMM to capture an image.

FIG. 4C is a view exemplarily illustrating a cross-section of the display module DP corresponding to one pixel. Referring to FIG. 4C, a pixel PX may include a transistor TR and a light emitting element OLED. The light emitting element OLED may include a first electrode AE (or an anode), a second electrode CE (or a cathode), a hole control layer HCL, an electron control layer ECL, and a light emitting layer EML.

The transistor TR and the light emitting element OLED may be disposed on a substrate SUB. Illustratively, one transistor TR is illustrated, but substantially, the pixel PX may include a plurality of transistors for driving the light emitting element OLED and at least one capacitor.

The display region DA may include a light emitting region PA corresponding to each of the pixels PX and a non-light emitting region NPA around the light emitting region PA. The light emitting element OLED may be disposed in the light emitting region PA.

On the substrate SUB, a buffer layer BFL is disposed, and the buffer layer BFL may be an inorganic layer. On the buffer layer BFL, a semiconductor pattern may be disposed. The semiconductor pattern may include polysilicon, amorphous silicon, or a metal oxide.

The semiconductor pattern may provide a plurality of regions having different conductivity. For example, the semiconductor pattern may be doped with an N-type dopant or a P-type dopant. The semiconductor pattern may include a high-doped region and a low-doped region. The conductivity of the high-doped region may be greater than the low-doped region, and may substantially serve as a source electrode and a drain electrode of the transistor TR. The low-doped region may substantially correspond to an active (or a channel) of a transistor.

Alternatively, the semiconductor pattern may include a metal oxide, and depending on the degree of reduction of a metal, the conductivity may vary in each region of the semiconductor pattern. For example, a reduced region in the semiconductor pattern has high conductivity, and thus may substantially serve as a source electrode and a drain electrode of the transistor TR. A non-reduced region in the semiconductor pattern may substantially correspond to an active (or a channel) of a transistor.

A source S, an active A, and a drain D of the transistor TR may be formed from the semiconductor pattern. On the semiconductor pattern, a first insulation layer INS1 may be disposed. On the first insulation layer INS1, a gate G of the transistor TR may be disposed. On the gate G, a second insulation layer INS2 may be disposed. On the second insulation layer INS2, a third insulation layer INS3 may be disposed.

A connection electrode CNE may include a first connection electrode CNE1 and a second connection electrode CNE2 to connect the transistor TR and the light emitting element OLED. The first connection electrode CNE1 is disposed on the third insulation layer INS3, and may be connected to the drain D through a first contact hole CH1 defined in the first to third insulation layers INS1 to INS3.

A fourth insulation layer INS4 may be disposed on the first connection electrode CNE1. On the fourth insulation layer INS4, a fifth insulation layer INS5 may be disposed. The second connection electrode CNE2 may be disposed on the fifth insulation layer INS5. The second connection electrode CNE2 may be connected to the first connection electrode CNE1 through a second contact hole CH2 defined in the fourth and fifth insulation layers INS4 and INS5.

On the second connection electrode CNE2, a sixth insulation layer INS6 may be disposed. Layers from the buffer layer BFL to the sixth insulation layer INS6 may be defined as a circuit element layer DP-CL. The first insulation layer INS1 to the sixth insulation layer INS6 may be inorganic layers or organic layers.

On the sixth insulation layer INS6, the first electrode AE may be disposed. The first electrode AE may be connected to the second connection electrode CNE2 through a third contact hole CH3 defined in the sixth insulation layer INS6. On the first electrode AE and the sixth insulation layer INS6, a pixel definition film PDL having an opening PXOP for exposing a predetermined portion of the first electrode AE may be defined.

The hole control layer HCL may be disposed on the first electrode AE and the pixel definition film PDL. The hole control layer HCL may include a hole transport layer and a hole injection layer.

The light emitting layer EML may be disposed on the hole control layer HCL. The light emitting layer EML may be disposed in a region corresponding to the opening PXOP. The light emitting layer EML may include an organic material and/or an inorganic material. The light emitting layer EML may generate light of any one of red, green, and blue colors.

The electron control layer ECL may be disposed on the light emitting layer EML and the hole control layer HCL. The electron control layer ECL may include an electron transport layer and an electron injection layer. The hole control layer HCL and the electron control layer ECL may be commonly disposed in the light emitting region PA and the non-light emitting region NPA.

The second electrode CE may be disposed on the electron control layer ECL. The second electrode CE may be commonly disposed in the pixels PX. A layer on which the light emitting element OLED is disposed may be defined as a display element layer DP-OLED.

A thin film encapsulation layer TFE may be disposed on the second electrode CE to cover the pixel PX. The thin film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2.

The first and third encapsulation layers EN1 and EN3 include inorganic insulation layers, and may protect the pixel PX from moisture/oxygen. The second encapsulation layer EN2 includes an organic insulation layer, and may protect the pixel PX from foreign materials such as dust particles.

A first voltage may be applied to the first electrode AE through the transistor TR, and a second voltage having a level lower than the first voltage may be applied to the second electrode CE. A hole and an electron injected into the light emitting layer EML are combined to form an exciton, and when the exciton transits to a ground state, the light emitting element OLED may emit light.

On the thin film encapsulation layer TFE, an input sensor ISP may be disposed. The input sensor ISP may be directly provided on an upper surface of the thin film encapsulation layer TFE.

On the thin film encapsulation layer TFE, a base layer BS may be disposed. The base layer BS may include an inorganic insulation layer. At least one inorganic insulation layer may be provided as the base layer BS on the thin film encapsulation layer TFE.

The input sensor ISP may include a first conductive pattern CTL1 and a second conductive pattern CTL2 disposed on the first conductive pattern CTL1. On the base layer BS, the first conductive pattern CTL1 may be disposed. An insulation layer TINS may be disposed on the base layer BS so as to cover the first conductive pattern CTL1. The insulation layer TINS may include an inorganic insulation layer or an organic insulation layer. On the insulation layer TINS, the second conductive pattern CTL2 may be disposed.

The first and second conductive patterns CTL1 and CTL2 may overlap the non-light emitting region NPA. The first and second conductive patterns CTL1 and CTL2 may be disposed on the non-light emitting region NPA between the light emitting regions PA, and may have a mesh shape.

The first and second conductive patterns CTL1 and CTL2 may form sensors of the input sensor ISP described above. For example, the first and second conductive patterns CTL1 and CTL2 in a mash shape may be separated from each other in a predetermined region and form the sensors. A portion of the second conductive pattern CTL2 may be connected to the first conductive pattern CTL1.

On the second conductive pattern CTL2, a refection prevention layer RPL may be disposed. The refection prevention layer RPL may include a black matrix BM and a plurality of color filters CF. The black matrix BM may overlap the non-light emitting region NPA, and the color filters CF may respectively overlap the light emitting regions PA.

The black matrix BM may be disposed on the insulation layer TINS to cover the second conductive pattern CTL2. In the black matrix BM, an opening BOP overlapping the light emitting region PA and the opening PXOP may be defined. The black matrix BM may absorb and block light. A width of the opening portion BOP may be greater than a width of the opening portion PX_O.

The color filters CF may be disposed on the first insulation layer TINS and the black matrix BM. The color filters CF may be respectively disposed in the openings BOP. On the color filters CF, a planarization insulation layer PINS may be disposed. The planarization insulation layer PINS may provide a flat upper surface.

When the external light traveling toward the display panel DP is reflected from the display panel DP and provided back to an external user, like a mirror, the user may visually recognize the external light. To prevent such a phenomenon, illustratively, the reflection prevention layer RPL may include color filters CF displaying the same color as that of the pixels PX of the display panel DP. The color filters CF may filter external light with the same colors as those of the pixels PX. In this case, the external light might not be visually recognized by the user.

However, the embodiment of the inventive concept is not necessarily limited thereto, and the reflection prevention layer RPL may include a polarizing film in order to reduce the reflectance rate of the external light. The polarizing film may be separately prepared and attached to the input sensor SP by an adhesive layer. The polarizing film may include a phase retarder and/or a polarizer.

Figure 5A:
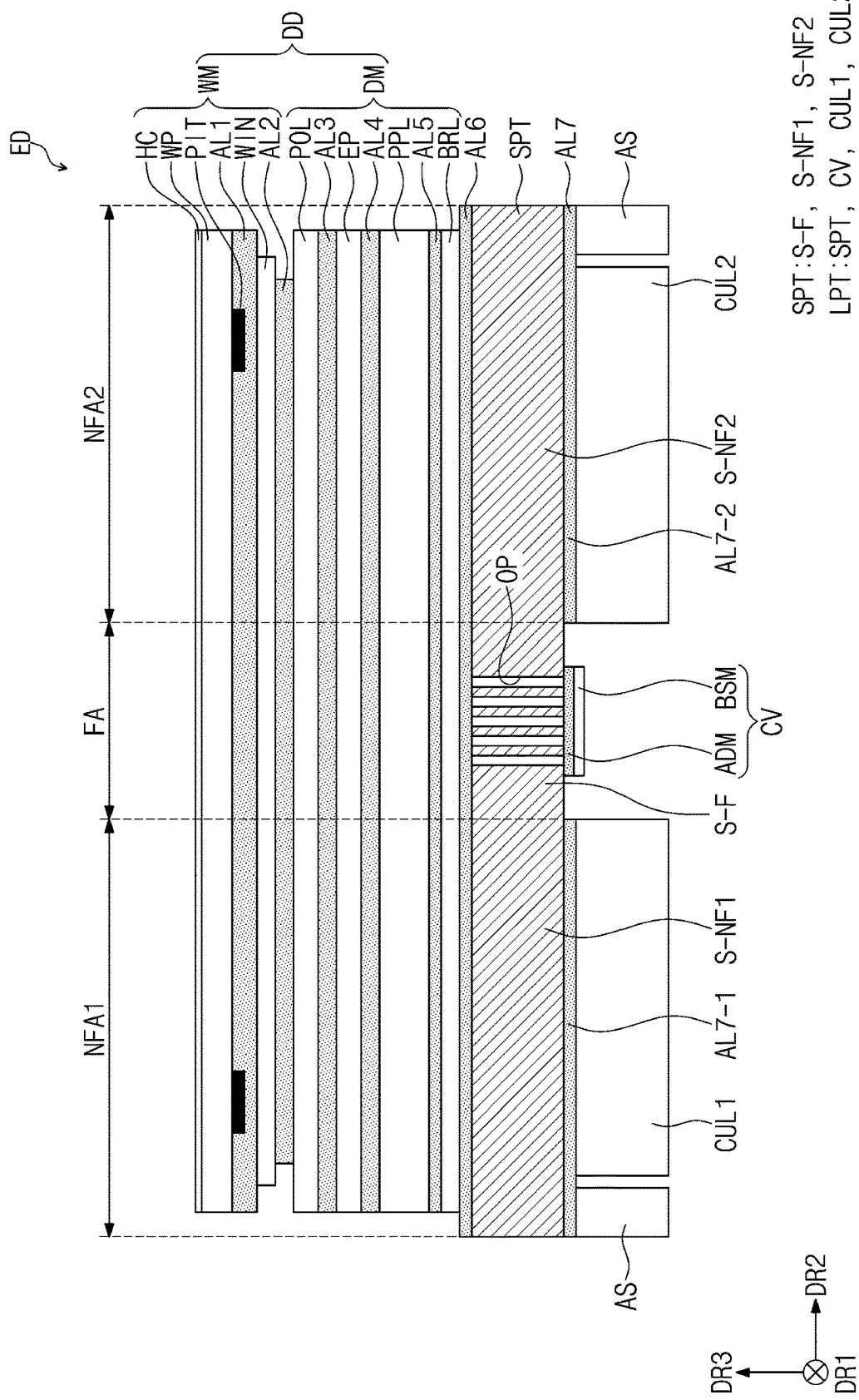
FIG. 5A is a cross-sectional view of an electronic apparatus according to an embodiment of the inventive concept.
Figure 5B:
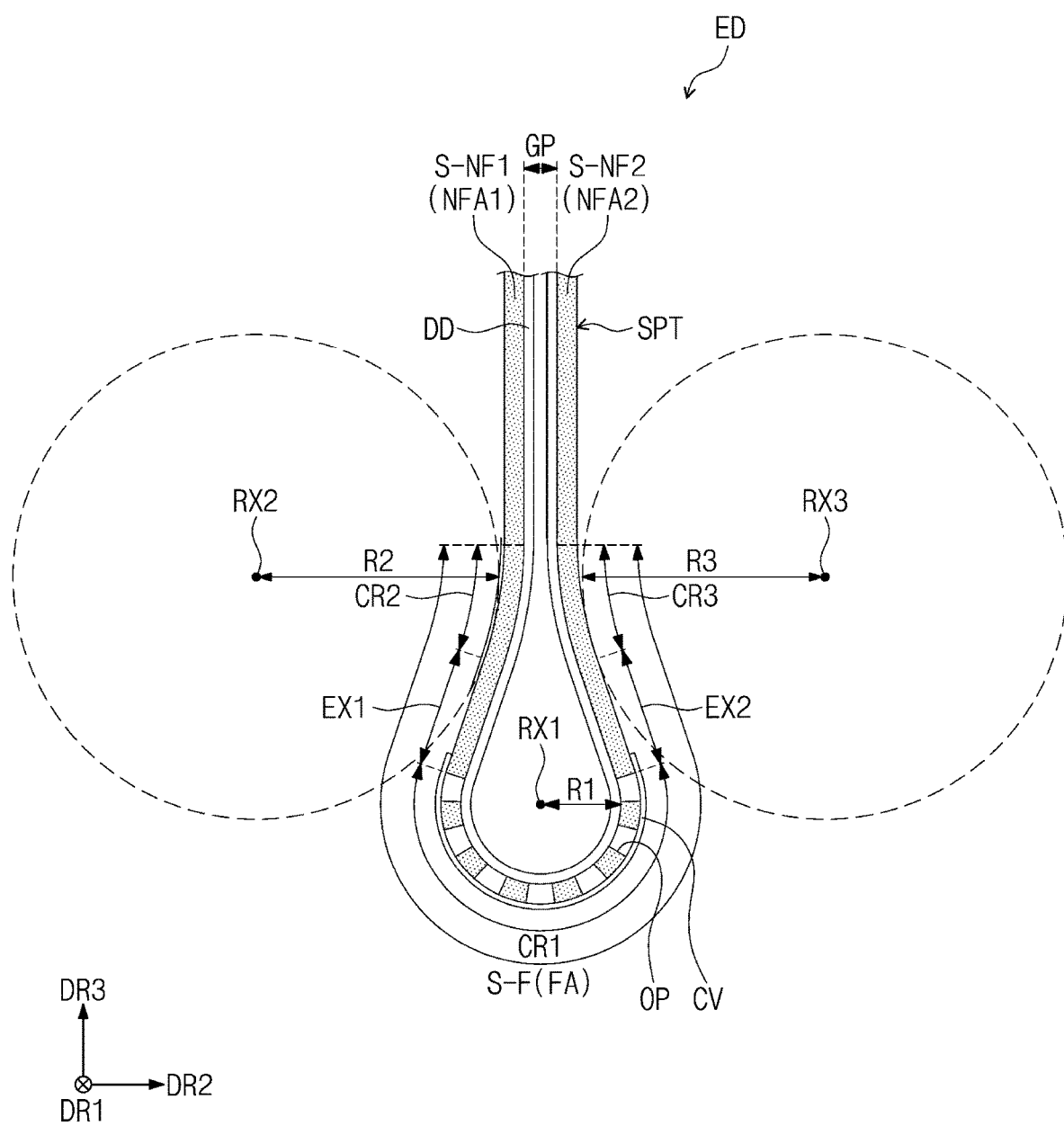
FIG. 5B is a cross-sectional view of an electronic apparatus in a folded state according to an embodiment of the inventive concept.

FIG. 5A is a cross-sectional view of an electronic apparatus according to an embodiment of the inventive concept. FIG. 5B is a cross-sectional view of an electronic apparatus in a folded state according to an embodiment of the inventive concept. FIG. 5A illustrates a stacked structure of the window module WP, the display module DM, and the lower portion LPT among the components of the electronic apparatus ED illustrated in FIG. 3, and omits the illustration of the electronic modules EM1 and EM2, the power module PM, and the cases EDC1 and EDC2.

The window module WM is coupled to an upper side of the display module DM. The window module WM may include a window WIN, a window protection layer WP, a hard coating layer HC, a bezel pattern PIT, and first and second adhesive layers AL1 and AL2.

The window WIN may be disposed on the display module DM. The window WIN may protect the display panel DP and input sensor ISP which constitute the display module DM from external scratches.

The window WIN may include an optically transparent material. For example, the window WIN may include glass, and for example, may include tempered glass. However, the embodiment of the inventive concept is not necessarily limited thereto, and the window WIN may include a synthetic resin film.

The window WIN may have a multi-layered structure or a single-layered structure. For example, the window WIN may include a plurality of synthetic resin films coupled using an adhesive, or may include a glass substrate and a synthetic resin film coupled using an adhesive.

The window protection layer WP may be disposed on the window WIN. The window protection layer WP may include an organic matter. For example, the window protection layer WP may include polyimide, polycarbonate, polyamide, tri-acetylcellulose, polymethylmethacrylate, and/or polyethylene terephthalate. However, the material of the window protection layer WP is not necessarily limited thereto.

The hard coating layer HC may be disposed on the window protection layer WP. The hard coating layer HC may supplement the rigidity of the window module WM and may provide a flat upper surface. The hard coating layer HC may include at least one functional layer. For example, the functional layer may include a fingerprint prevention layer, a reflection prevention layer, or the like.

The bezel pattern PIT may be disposed on a lower surface of the window protection layer WP. However, the embodiment of the inventive concept is not necessarily limited thereto, and the bezel pattern PIT may be disposed on an upper surface or a lower surface of the window WIN. The bezel pattern PIT may be formed by coating, printing, or the like. A region in which the bezel pattern PIT is disposed may correspond to the non-display region NDA (see FIG. 1A) of the electronic apparatus ED described above. The bezel pattern PIT may include a colored light blocking film.

The first adhesive layer AL1 may be disposed between the window WIN and the window protection layer WP and couple the window WIN and the window protection layer WP. The first adhesive layer AL1 may cover the bezel pattern PIT. The second adhesive layer AL2 may be disposed on the lower surface of the window WIN and attach the window WIN on the display module DM.

The display module DM may include an electronic panel EP, an optical film layer POL, a panel protection layer PPL, and third to fifth adhesive layers AL3 to AL5. The electronic panel EP may be provided as a panel including the display panel DP (see FIG. 4C) and the input sensor ISP (see FIG. 4C) described above.

The optical film layer POL may be disposed on the electronic panel EP. The optical film layer POL may include a polarizing film in order to reduce the reflectance rate of external light incident on the electronic panel EP. The polarizing film may include a phase retarder and/or a polarizer. The optical film layer POL may include a protection film to protect the electronic panel EP by absorbing an external impact applied toward the electronic panel EP from an upper portion of the electronic apparatus ED. In an embodiment, the optical film layer POL may include a polarizing film or a protection film, or may include a polarizing film and a protection film sequentially stacked. This is exemplarily illustrated, and in the electronic apparatus ED according to an embodiment of the inventive concept, the optical film layer POL may be omitted. The refection prevention layer RPL (see FIG. 4C) included in the electronic panel EP may replace the function of the optical film layer POL.

The optical film layer POL may be coupled on the electronic panel EP by the third adhesive layer AL3 disposed between the electronic panel EP and the optical film layer POL. However, the embodiment of the inventive concept is not necessarily limited thereto, and the optical film layer POL may be directly disposed on the electronic panel EP, or may be omitted.

The panel protection layer PPL may be disposed below the electronic panel EP. The panel protection layer PPL may be coupled to a rear surface of the electronic panel EP by the fourth adhesive layer AL4 disposed between the panel protection layer PPL and the electronic panel EP. The panel protection layer PPL may protect a lower portion of the electronic panel EP. The panel protection layer PPL may prevent scratches from generated on the rear surface of the electronic panel EP during a process of manufacturing the electronic panel EP.

The panel protection layer PPL may include a synthetic resin film. For example, the panel protection layer PPL may include polyamide and/or polyethylene terephthalate. However, the material of the panel protection layer PPL is not necessarily limited thereto.

A lower barrier layer BRL may be disposed on a lower side of the panel protection layer PPL. The lower barrier layer BRL may be coupled to a rear surface of the panel protection layer PPL by the fifth adhesive layer AL5 disposed between the panel protection layer PPL and the lower barrier layer BRL. The lower barrier layer BRL blocks light entering a lower side of the electronic panel EP. For example, it is possible to prevent the occurrence of a phenomenon in which the rear surface of the electronic panel EP is projected. The lower barrier layer BRL may include a material having a high light absorption rate, or may have a color having high light blocking properties such as black or gray.

The sixth adhesive layer AL6 may be disposed between the lower barrier layer BRL and the lower portion LPT and couple the lower barrier layer BRL and the lower portion LPT. The sixth adhesive layer AL6 may overlap the entire display module DM on a plane. For example, the sixth adhesive layer AL6 may overlap all of the folding region FA, and the first and second non-folding regions NFA1 and NFA2. A detailed description thereof will be described later.

Each of the first to sixth adhesive layers AL1 and AL6 may include a transparent adhesive, such as a pressure sensitive adhesive (PSA) or an optically clear adhesive (OCA), but the type of the adhesive is not necessarily limited thereto.

The lower portion LPT may be disposed below the display module DM. The lower portion LPT may include a support plate SPT, a cover CV, adhesive layers AL1 and AL2, cushion layers CUL1 and CUL2, and a step compensator AS.

The support plate SPT may be disposed on the lower side of the display module DM and support the display module DM. The support plate SPT may have a higher modulus than the display module DM. The support plate SPT may be formed of various materials. For example, the support plate SPT may include a metal such as aluminum, an alloy, or the like. The support plate SPT includes a metal having high rigidity, and thus may stably support the display module DM.

Alternatively, the support plate SPT may include a non-metal material. For example, the support plate SPT may include a reinforced fiber composite material. The reinforced fiber composite material may be carbon fiber reinforced plastic (CFRP) or glass fiber reinforced plastic (GFRP).

The support plate SPT may become lightweight by including a reinforced fiber composite material. The support plate SPT according to an embodiment includes the reinforced fiber composite material, and thus may be light in weight compared to a metal support plate using a metal material, may have a similar level of modulus and strength to those of the metal support plate, and may have excellent heat dissipation properties.

In addition, since the support plate SPT includes a reinforced fiber composite material, the shape processing of the support plate SPT may be easily performed compared to that of a metal support plate. For example, the support plate SPT including the reinforced fiber composite material may be more easily processed through a laser process or a microblast process.

As described above, the support plate SPT may include the folding portion S-F overlapping the folding region FA and supporting a region in the display module DM which corresponds to the folding region FA, the first support portion S-NF1 overlapping the first non-folding region NFA1 and supporting a region in the display module DM which corresponds to the first non-folding region NFA1, and the second support portion S-NF2 overlapping the second non-folding region NFA2 and supporting a region in the display module DM which corresponds to the second non-folding region NFA2.

The openings OP defined in the folding portion S-F pass through the support plate SPT on a cross-section. The area of a region in which the plurality of openings OP are formed may be substantially the same as or smaller than the area of the folding region FA. Due to the openings OP defined in the folding portion S-F, the support plate SPT may reduce folding stress concentrated on the folding portion S-F and may facilitate a folding operation.

A folding operation of the display module DM may be performed substantially by the support plate SPT. In this regard, a more detailed description will be given with reference to FIG. 5B. In FIG. 5B, for convenience of description, a cross-section of the display device DD is schematically illustrated, and the illustration of other components except for the cover CV in the lower portion LPT is omitted. FIG. 5B illustrates a cross-section of the electronic apparatus ED in a folded state viewed in the first direction DR1, and the first support portion S-NF1 and the second support portion S-NF2 of the support plate SPT are illustrated in the third direction DR3.

The folding portion S-F overlapping the folding region FA may include a first curved portion CR1, a second curved portion CR2, a third curved portion CR3, a first extension portion EX1, and a second extension portion EX2 having a shape of a single body. Each of the first to third curved portions CV1, CV2, and CV3 may be portions bent with a predetermined curvature in the folding portion S-F.

The first curved portion CR1 may be positioned at the center of the folding portion S-F, and may be disposed between the first extension portion EX1 and the second extension portion EX2. The first extension portion EX1 may be a portion extending from one end parallel to the first direction DR1 of the first curved portion CR1, and the second extension portion EX2 may be a portion extending from the other end parallel to the first direction DR1 of the first curved portion CR1. The first extension portion EX1 may be disposed between the first curved portion CR1 and the third curved portion CR2. The second extension portion EX2 may be disposed between the first curved portion CR1 and the third curved portion CR3.

The second curved portion CR2 may be disposed between the first extension portion EX1 and the first support portion S-NF1. The third curved portion CR3 may be disposed between the second extension portion EX2 and a second support portion BS-S2. A boundary between the second curved portion CR2 and the first support portion S-NF1 may correspond to a boundary between the folding region FA and the first non-folding region NFA1. A boundary between the third curved portion CR3 and the second support portion S-NF2 may correspond to a boundary between the folding region FA and the second non-folding region NFA2.

The plurality of openings OP may be defined in the folding portion S-F. In an embodiment, the plurality of openings OP may be defined in the first curved portion CR1. As described above with reference to FIG. 3A, the plurality of openings OP may have a shape extending along in the first direction DR1, and may be arranged in the first direction DR1 and the second direction DR2. The first curved portion CR1 may be easily folded due to the plurality of openings OP.

When a substrate BS is folded, the first curved portion CR1 may be bent to a first radius of curvature R1 based on a first curvature center RX1 facing an upper surface of the substrate BS. Each of the second curved portion CR2 and the third curved portion CR3 may be bent opposite to the first curved portion CR1. The second curved portion CR2 may be bent to a second radius of curvature R2 based on a second curvature center RX2 facing a lower surface of the substrate BS. The third curved portion CR3 may be bent to a third radius of curvature R3 based on a third curvature center RX3 facing the lower surface of the substrate BS.

The second curved portion CR2 and the third curved portion CR3 may have shapes symmetrical to each other with the first curved portion CR1 interposed therebetween. In an embodiment, the second radius of curvature R2 and the third radius of curvature R3 may have substantially the same value. For example, the second curved portion CR2 and the third curved portion CR3 may be bent to substantially the same curvature.

In an embodiment, the first radius of curvature R1 may be smaller than each of the second radius of curvature R2 and the third radius of curvature R3. Since the radius of curvature is inversely proportional to the curvature, the first curved portion CR1 may be bent to a curvature greater than that of the second curved portion CR2 and the third curved portion CR3. The first curved portion CR1 includes the plurality of openings OP, and thus may be more easily bent than the second curved portion CR2 and the third curved portion CR3, and accordingly, may be bent to a greater curvature.

When the support plate SPT is folded, the first support portion S-NF1 and the second support portion S-NF2 may maintain a flat state. When the support plate SPT is folded, the first support portion S-NF1 and the second support portion S-NF2 may face each other. When the support plate SPT is folded, a distance GP between the first support portion S-NF1 and the second support portion S-NF2 may be smaller than the first radius of curvature R1. Accordingly, the support plate SPT may be folded into a dumbbell shape.

The display module DM may be folded in accordance with the folding of the support plate SPT. As described above, since the display module DM is coupled to the support plate SPT through the adhesive layer AL6, the folding shape of the display module DM may be determined by the support plate SPT. The display module DM may be folded into a dumbbell shape corresponding to the support plate SPT.

As the electronic apparatus ED is folded into a dumbbell shape, the distance GP between the first support portion S-NF1 and the second support portion S-NF2 is minimized without excessively reducing the radius of curvature R1 of the folding region FA, so that a compact folding shape may be implemented. Accordingly, reliability and portability of the electronic apparatus ED may all be increased.

As the support plate SPT is folded into a dumbbell shape, the first radius of curvature R1 defining a folding curvature with respect to the same distance GP between the first support portion S-NF1 and the second support portion S-NF2 may be increased. Accordingly, the degree of folding stress or deformation applied to the folding portion S-F be relieved. Accordingly, the sixth adhesive layer AL6 according to the inventive concept may be provided in a shape of a single body overlapping front surfaces of the folding region FA and the non-folding regions NFA1 and NFA2. Since a front surface of the support plate SPT including the folding portion S-F is coupled to the display module DM through the sixth adhesive layer AL6, the display module DM and the lower portion LPT may be stably coupled to each other, and problems such as interlayer delamination which may occur during folding may be prevented.

Referring back to FIG. 5A, the cover CV is disposed on a lower side of the support plate SPT. The cover CV overlaps the folding region FA, and covers a rear surface of the folding portion S-F of the support plate SPT. The cover CV may overlap a region in which at least the openings OP are formed in the folding portion S-F. The cover CV may prevent foreign matters from entering the openings OP.

The cover CV may include an adhesive ADM and a base BSM. The adhesive ADM couples the base BSM and the support plate SPT. The adhesive ADM may be in contact with a rear surface of the support plate SPT. The adhesive ADM may be flexible such that the shape thereof may be easily changed according to a folding operation of the folding portion S-F. For example, the adhesive ADM may include a pressure sensitive adhesive (PSA), but the type of the adhesive is not necessarily limited thereto.

The base BSM may be flexible such that the shape thereof may be easily changed according to the folding operation of the folding portion S-F. The base BSM may be formed of various materials, such as a metal, an insulator, tempered glass, and reinforced fiber, as long as it may be stably attached to the adhesive ADM and be folded while covering the folding portion S-F. For example, the base BSM may include plastic having high ductility such as thermoplastic polyurethane (TPU), but the material of the base BSM is not necessarily limited thereto.

The cushion layers CUL1 and CUL2 and the step compensator AS are disposed in a lower portion of the support plate SPT. The cushion layers CUL1 and CUL2 and the step compensator AS may be coupled to the rear surface of the support plate SPT through a seventh adhesive layer AL7. The seventh adhesive layer AL7 may include a transparent adhesive, such as a pressure sensitive adhesive (PSA) or an optically clear adhesive (OCA), but the type of the adhesive is not necessarily limited thereto. The seventh adhesive layer AL7 may be divided into two portions of an adhesive layer AL7-1 disposed in the first non-folding region NFA1 and an adhesive layer AL7-2 disposed in the second non-folding region NFA2.

In the present embodiment, the cushion layers CUL1 and CUL2 may include a first cushion layer CUL1 and a second cushion layer CUL2 spaced apart from each other in the second direction DR2 with the folding region FA interposed therebetween. The first cushion layer CUL1 is disposed in the first non-folding region NFA1 and coupled to the rear surface of the support plate SPT through a corresponding adhesive layer AL7-1. The second cushion layer CUL2 is disposed in the second non-folding region NFA2 and coupled to the rear surface of the support plate SPT through a corresponding adhesive layer AL7-2. Since the cushion layers CUL1 and CUL2 are not disposed in the folding region FA, it is possible to prevent folding stress from being applied to the cushion layers CUL1 and CUL2, and a folding operation of the electronic apparatus ED may be smoothly performed.

The cushion layers CUL1 and CUL2 may absorb an external impact to protect the display module DM, and may mitigate a physical impact which may be directly applied to the support plate SPT. The cushion layers CUL1 and CUL2 may include a foam sheet having a predetermined elastic force. In an embodiment, the cushion layers CUL1 and CUL2 may include sponge or polyurethane.

The step compensator AS may be disposed on the lower side of the support plate SPT. The step compensator AS may be disposed on the outer periphery of the cushion layers CUL1 and CUL2 on a plane defined by the first direction DR1 and the second direction DR2. Accordingly, the step compensator AS may be spaced apart from the cushion layers CUL1 and CUL2 in a direction perpendicular to the third direction DR3. The step compensator AS may be provided in the form of a double-sided tape or an insulation film. In an embodiment, the step compensator AS may include a waterproof tape. The step compensator AS may be attached to a set bracket of the electronic apparatus ED and provided.

The stacked components of the electronic apparatus ED illustrated in FIG. 5A are only exemplary, and the stacking order between some components may be changed, or omitted. The electronic apparatus ED is not necessarily limited thereto, and may further have additional components disposed therein.

Figure 6A:
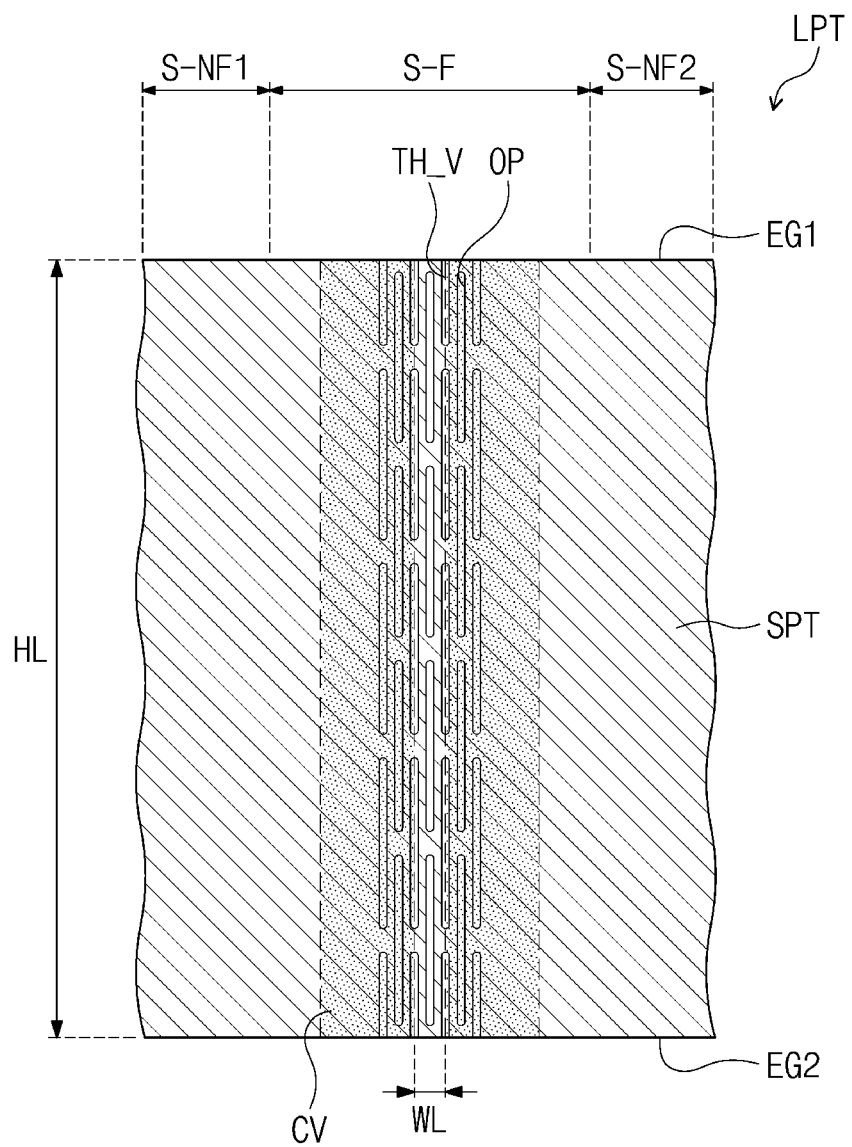
FIG. 6A to FIG. 6D are views illustrating a portion of an electronic apparatus according to an embodiment of the inventive concept.
Figure 6B:
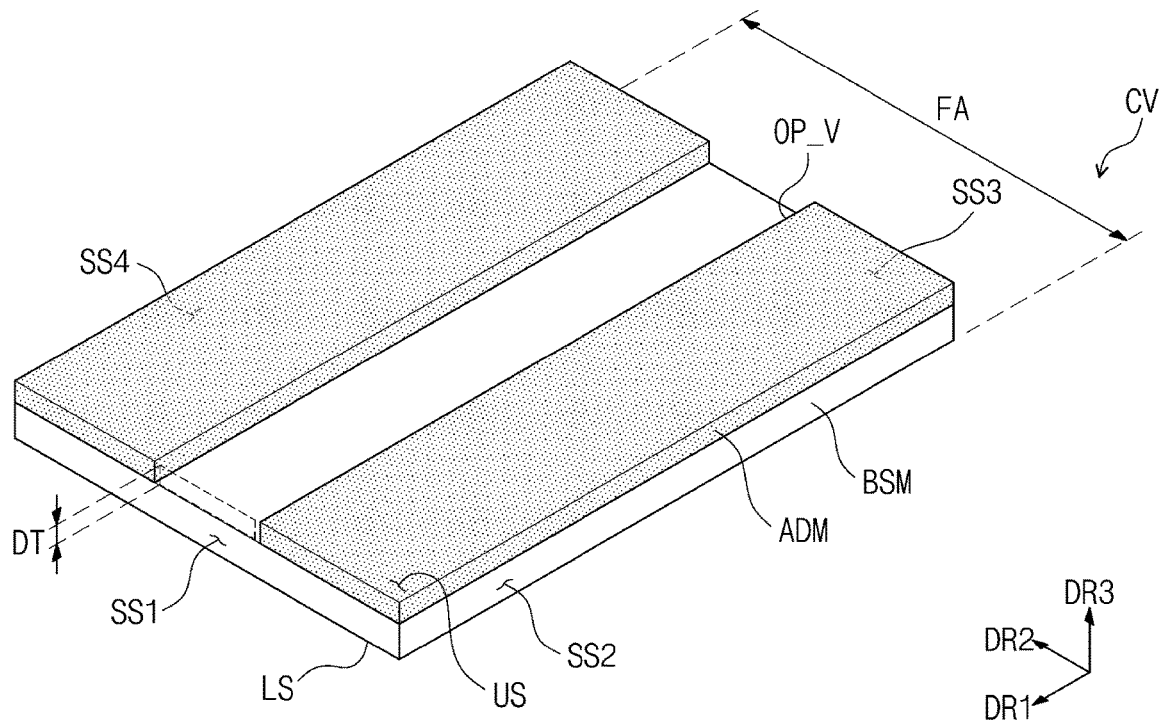
Figure 6C:
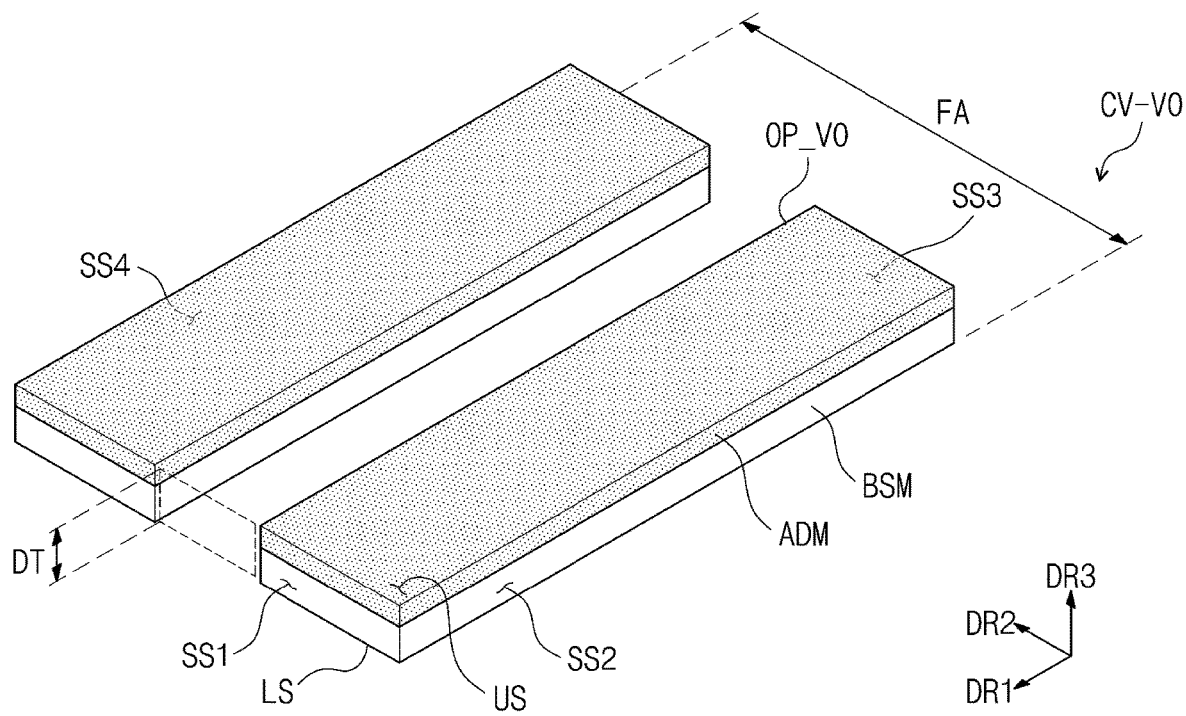
Figure 6D:
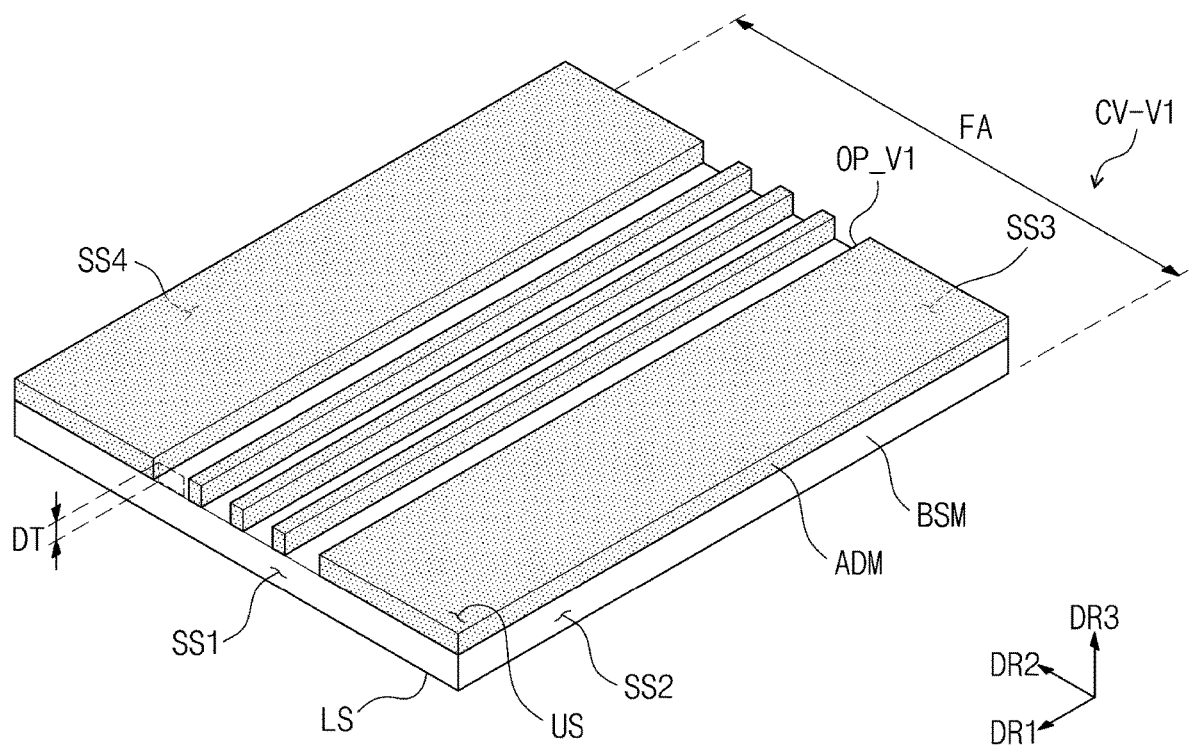

FIG. 6A to FIG. 6D are views illustrating a portion of an electronic apparatus according to an embodiment of the inventive concept. FIG. 6A is a plan view illustrating a portion of an electronic apparatus according to an embodiment of the inventive concept. FIG. 6B to FIG. 6D are perspective views illustrating a cover according to an embodiment of the inventive concept. Hereinafter, the inventive concept will be described with reference to FIG. 6A to FIG. 6D. The same reference numerals will be given to the same components as those described with reference to FIG. 1A to FIG. 5B, and to the extent that a description of an element is omitted, it may be assumed that the element is at least similar to corresponding elements that have been described elsewhere within the present disclosure.

FIG. 6A illustrates an overlapping structure of the support plate SPT and the cover CV. As illustrated in FIG. 6A, a through portion TH_V is defined in the folding region FA, and the cover CV overlaps at least the folding region FA on a plane. The through portion TH_V may extend along the first direction DR1 and pass through the cover CV in the first direction DR1. For example, when the length of the cover CV in the first direction DR1 is provided to be substantially the same as the width of the support plate SPT in the first direction DR1, the through portion TH_V may extend to a first edge EG1 and a second edge EG2 of the support plate SPT. The first edge EG1 and the second edge EG2 may be both side surfaces of the support plate SPT facing in the first direction DR1.

The through portion TH_V overlaps at least one of the openings OP on a plane. In the present embodiment, a width WL of the through portion TH_V in the second direction DR2 is illustrated as being larger than the width of any one opening OP in the second direction DR2, but is not necessarily limited thereto, and the width WL of the through portion TH_V in the second direction DR2 may be equal to or smaller than the width of the opening OP in the second direction DR2, but is not necessarily limited to one embodiment.

Referring to FIG. 6B, the through portion TH_V may be defined passing through the adhesive ADM along the first direction DR1. A through direction of the through portion TH_V is parallel to the first direction DR1, and the through portion TH_V passes through the upper surface US, the first side surface SS1, and a third side surface SS3 of the cover CV. A through length of the through portion TH_V defined in the first direction DR1 may correspond to a length of the adhesive ADM in the first direction DR1. A depth DT of the through portion TH_V in the third direction DR3 may be less than a thickness of the cover CV. In the present embodiment, the depth DT of the through portion TH_V is defined to correspond to a thickness of the adhesive ADM, but is not necessarily limited thereto. For example, the depth DT of the through portion TH_V may be greater or less than the thickness of the adhesive ADM.

Alternatively, referring to FIG. 6C, a depth DT0 of a through portion TH_V0 in the third direction DR3 may correspond to the thickness of the cover CV. The through portion TH_V0 may pass through a cover CV-V0 along the first direction DR1 and the third direction DR3.

Alternatively, referring to FIG. 6D, a through portion TH_V1 may be provided in plural. The plurality of through portions TH_V1 may pass through a cover CV-V1 along the first direction DR1, and may be spaced apart from each other in the second direction DR2. Each of the through portions TH_V1 may overlap at least one of the openings OP on a plane.

Figure 7B:
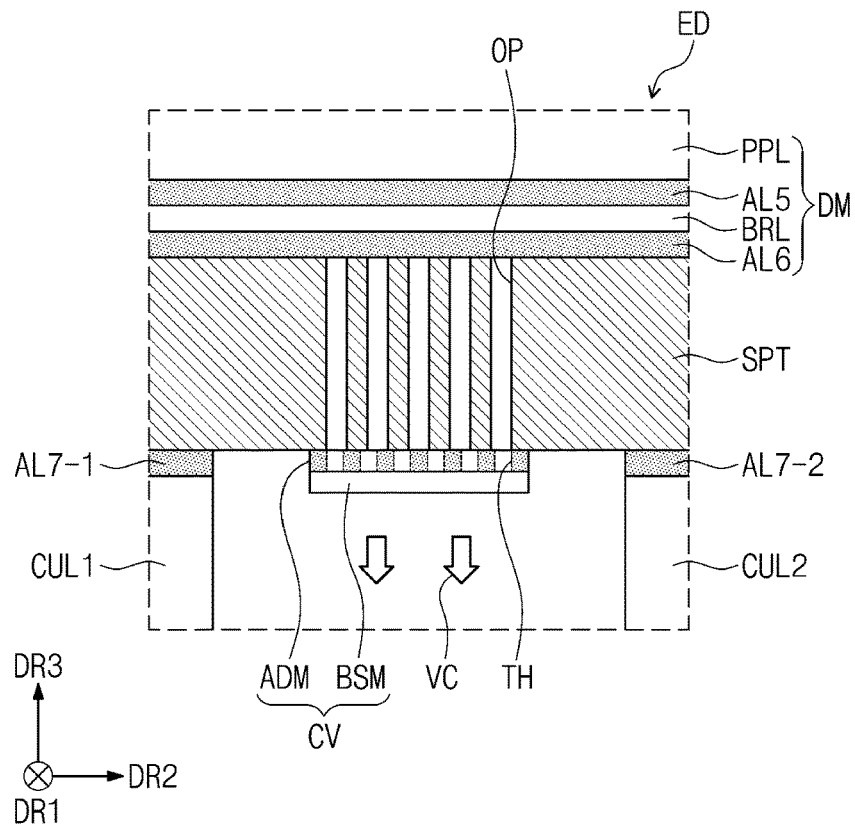
Figure 7C:
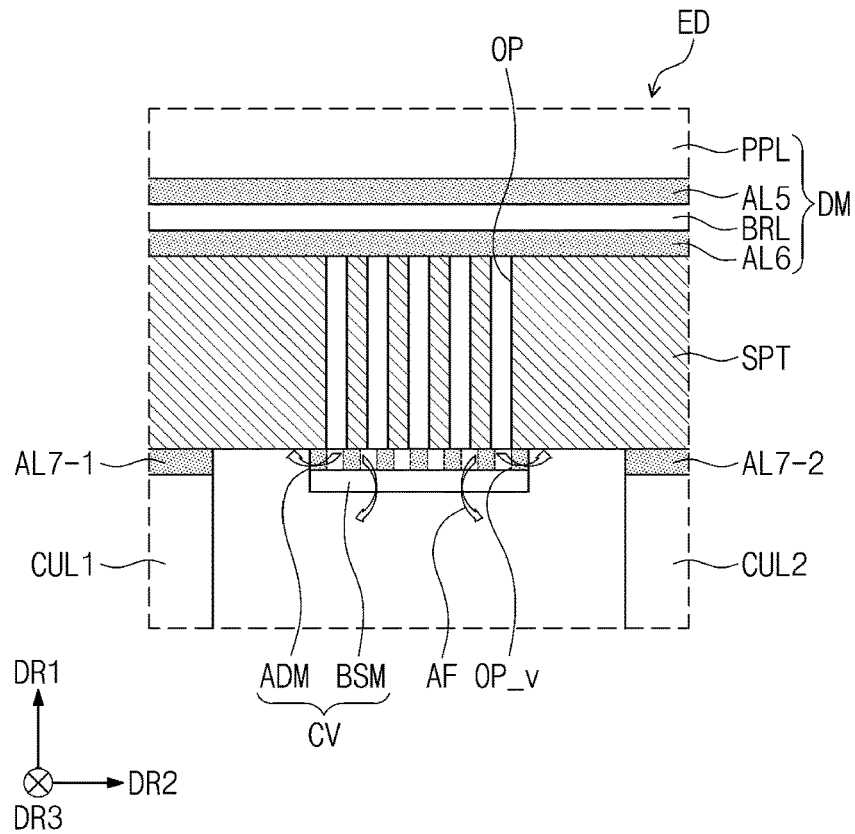
Figure 7D:
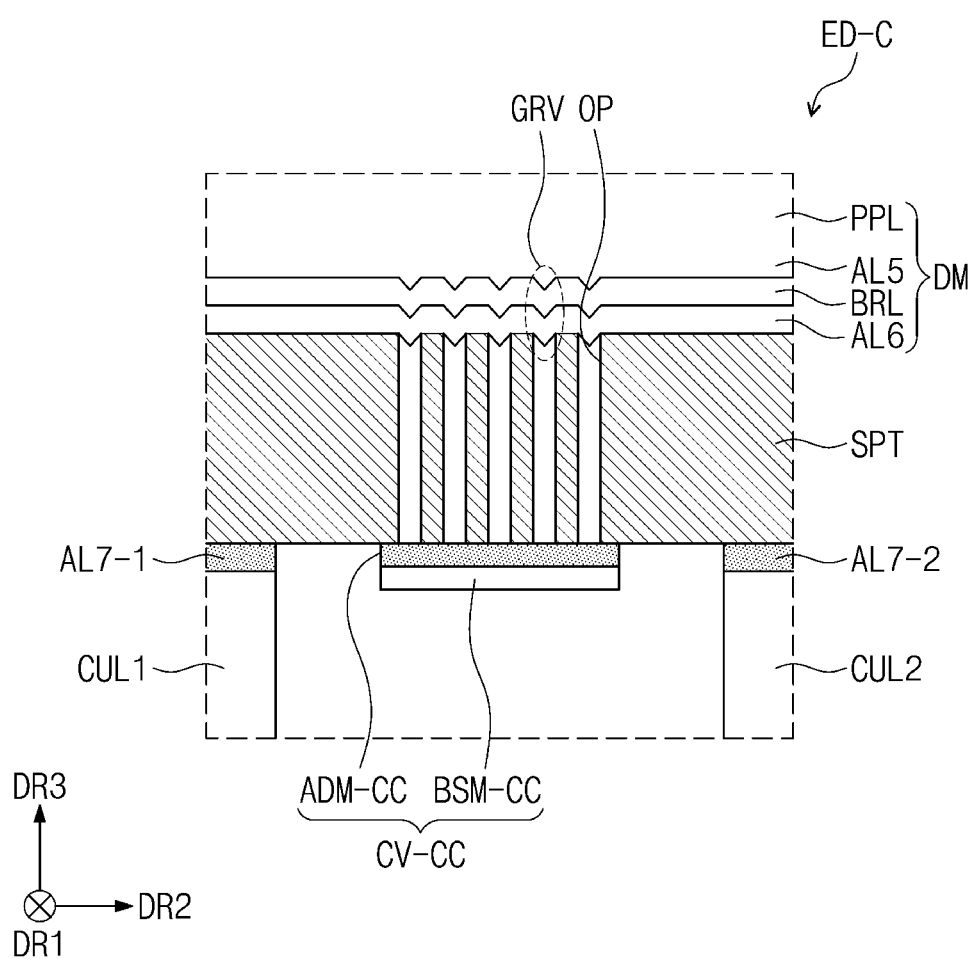
FIG. 7D is a cross-sectional view of a display device according to a comparative embodiment of the inventive concept.

FIG. 7A to FIG. 7C are cross-sectional views of a display device according to an embodiment of the inventive concept. FIG. 7D is a cross-sectional view of a display device according to a comparative embodiment of the inventive concept. FIG. 7A illustrates a view corresponding to FIG. 5, and FIG. 7B to FIG. 7D illustrate an enlarged region corresponding to the folding region FA. The cover CV illustrated in FIG. 7A to FIG. 7C may correspond to the cover CV-V1 (see FIG. 6D) illustrated in FIG. 6D. Hereinafter, with reference to FIG. 7A to FIG. 7D, the inventive concept will be described.

Referring to FIG. 7A and FIG. 7B, a display device, according to the inventive concept, may be formed through a step of coupling the display module DM and the lower portion LPT. The sixth adhesive layer AL6 is formed on the lower portion LPT, and the display module DM is disposed on the sixth adhesive layer AL6.

Thereafter, as illustrated in FIG. 7C, the display module DM and the lower portion LPT are coupled through vacuum lamination. The coupling between the display module DM and the lower portion LPT may be performed through a vacuum lamination method. The display module DM and the lower portion LPT are in close contact with each other through vacuum VC, and during this process, air present in the openings OP may be discharged to the outside through the through portions TH defined on the cover CV. As described above, since each of the through portions TH overlaps and communicates with at least one of the openings OP, a passage open to the outside via the through portions TH from the openings OP is formed, and an air flow AF flowing in and out through the passage may be generated.

On the contrary, as illustrated in FIG. 7D, a separate through portion is not present in a cover CV-CC according to a comparative embodiment. Therefore, although the vacuum VC is applied during vacuum lamination, the openings OP are sealed by the cover CV-CC and the sixth adhesive layer AL6, so that air present inside the openings OP remains. Therefore, thereafter, when the outside becomes to be in an atmospheric state, deformation such as a wrinkle may be generated in the display module DM due to the difference in air pressure between the air inside the openings OP and the outside atmosphere. Such deformation may become visible to the outside through the projection of the rear surface of the display panel, so that visibility may become poor.

According to the inventive concept, by forming the through portions TH on the cover CV, it is possible to block the inflow of foreign matters into the openings OP while smoothly allowing air to flow in and out during vacuum lamination. Accordingly, air present inside the openings OP in an atmospheric state may easily communicate with the outside by generating the air flow AF through the through portions TH in accordance with the changed difference in air pressure. Accordingly, even when the outside air pressure is changed, the air pressure inside the openings OP may be changed correspondingly, so that defects such as deformation GRV of the display module DM may be prevented from occurring. Therefore, the process reliability of an electronic apparatus may be increased.

Figure 8A:
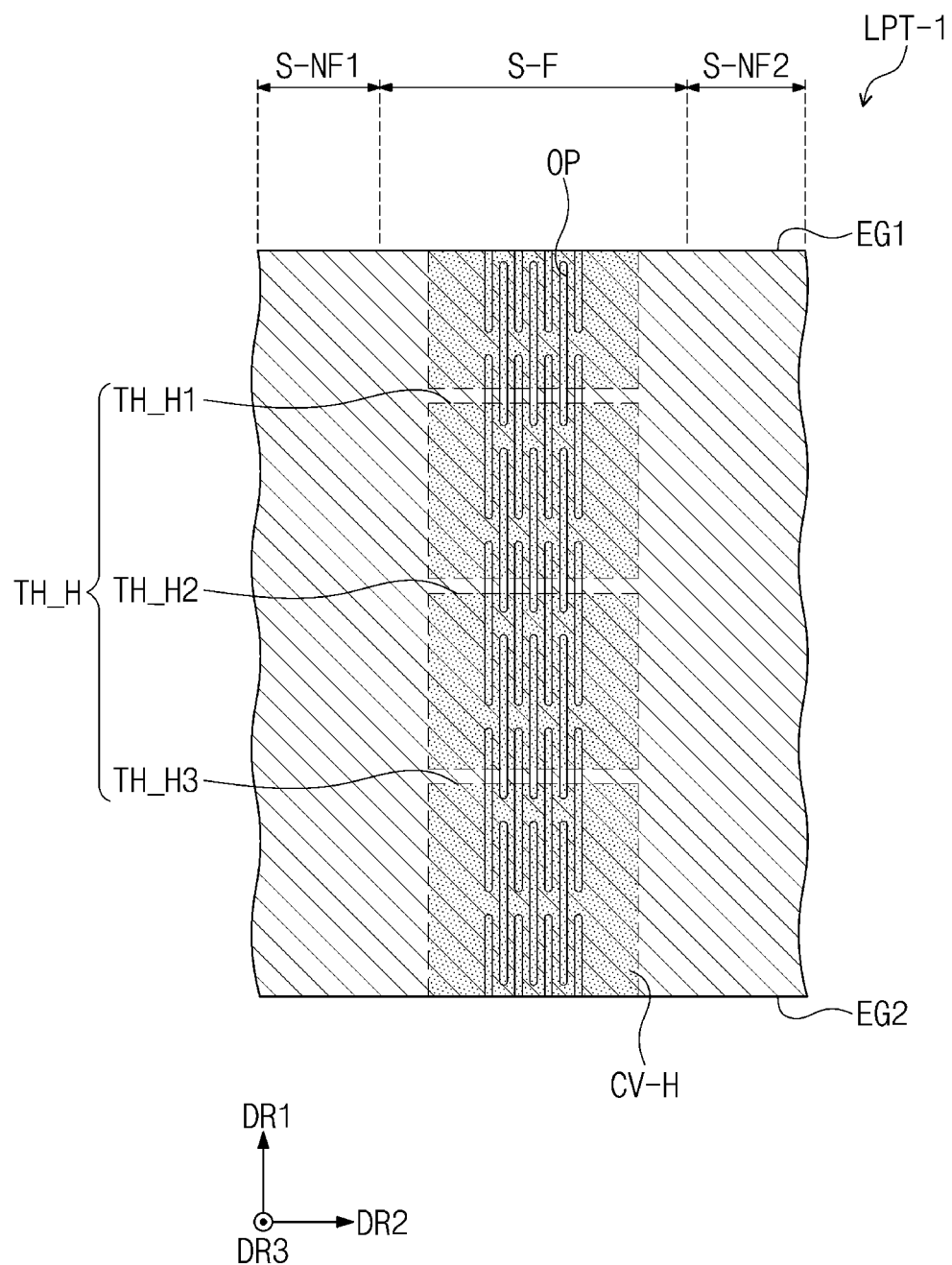
FIG. 8A and FIG. 8B are views illustrating a portion of an electronic apparatus according to an embodiment of the inventive concept.
Figure 8B:
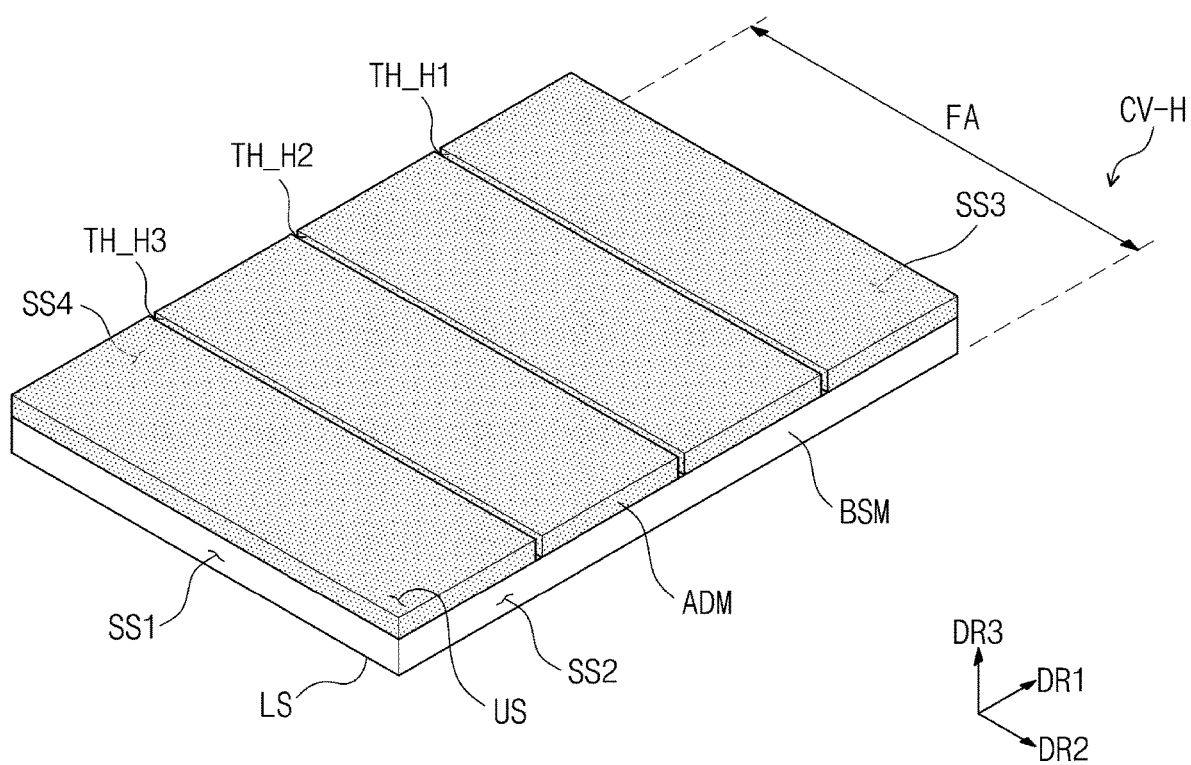

FIG. 8A and FIG. 8B are views illustrating a portion of an electronic apparatus according to an embodiment of the inventive concept. FIG. 8A is a plan view illustrating a portion of an electronic apparatus according to an embodiment of the inventive concept, which illustrates a region corresponding to FIG. 6A. FIG. 8B is a perspective view illustrating a cover according to an embodiment of the inventive concept, which is illustrated to correspond to FIG. 6B. Hereinafter, the inventive concept will be described with reference to FIG. 8A and FIG. 8B. The same reference numerals will be given to the same components as those described with reference to FIG. 1A to FIG. 7D, and to the extent that a description of an element is omitted, it may be assumed that the element is at least similar to corresponding elements that have been described elsewhere within the present disclosure.

As illustrated in FIG. 8A, a cover CV-H1 overlaps at least openings OP in a folding portion FA on a plane. A plurality of through portions TH_H may be defined on the cover CV-H1. Each of the through portions TH_H may pass through the cover CV-H1 along the second direction DR2. Accordingly, a through direction of each of the through portions TH_H may be the same as the second direction DR2, and a through length thereof may correspond to a width of the cover CV-H1 in the second direction DR2.

The through portions TH_H may include first to third through portions TH_H1, TH_H2, and TH_H3 arranged spaced apart from each other along the first direction DR1. Each of the first to third through portions TH_H1, TH_H2, and TH_H3 may overlap at least one of the openings OP on a plane. In the present embodiment, an opening and a through portion overlapping each other may have a shape of crossing each other on a plane.

Each of the first to third through portions TH_H1, TH_H2, and TH_H3 may be defined at a position overlapping all of the openings OP arranged along the second direction DR2. Accordingly, an air passage may be provided for all of the openings OP, so that the flow of air may be smoothly achieved, and defects which may be generated during a lamination process may be reduced. This is only exemplarily illustrated, and as long as the generation of defects during a process may be reduced, each of the first to third through portions TH_H1, TH_H2, and TH_H3 may be defined at a position overlapping some of the openings OP arranged along the second direction DR2, and is not necessarily limited to any one embodiment.

Referring to FIG. 8B, a depth DT of each of the first to third through portions TH_H1, TH_H2, and TH_H3 may be the same as a thickness of the adhesive ADM. Therefore, each of the first to third through portions TH_H1, TH_H2, and TH_H3 may have a groove shape formed on an upper surface US, and may have a shape of passing through a first side surface SS1 and a fourth side surface SS4. However, this is only exemplarily illustrated, and the depth DT of each of the first to third through portions TH_H1, TH_H2, and TH_H3 may be less than or greater than the thickness of the adhesive ADM. In addition, the first to third through portions TH_H1, TH_H2, and TH_H3 may have different depths from each other.

Figure 9A:
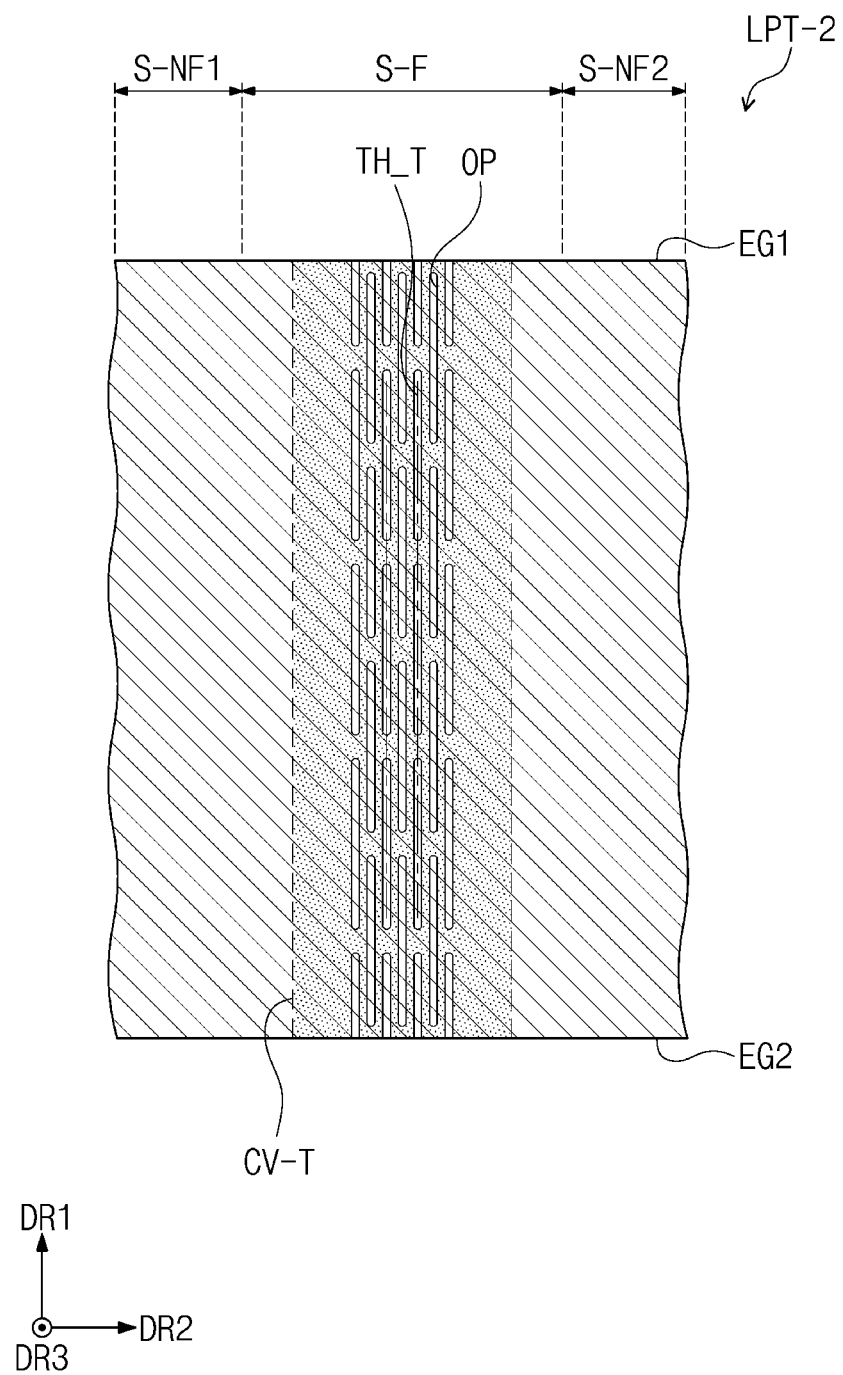
FIG. 9A and FIG. 9B are views illustrating a portion of an electronic apparatus according to an embodiment of the inventive concept.
Figure 9B:
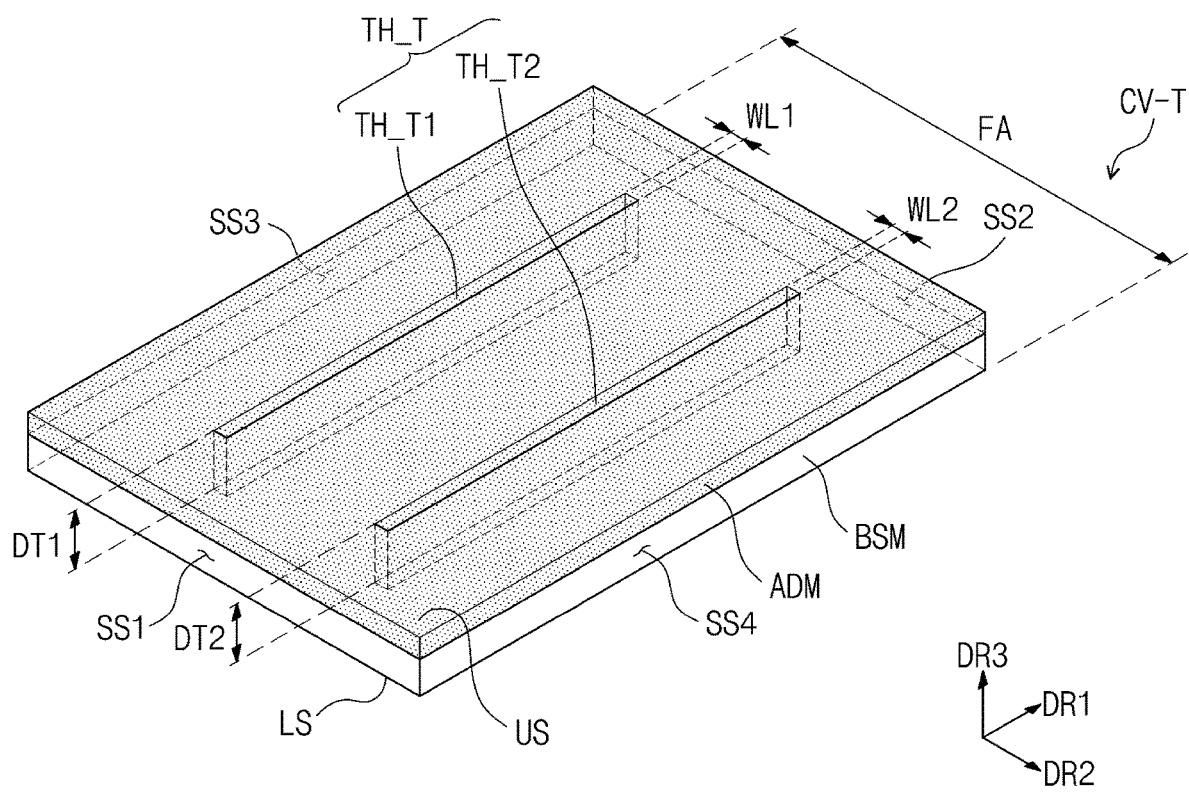

FIG. 9A and FIG. 9B are views illustrating a portion of an electronic apparatus according to an embodiment of the inventive concept. FIG. 9A is a plan view illustrating a portion of an electronic apparatus according to an embodiment of the inventive concept, which illustrates a region corresponding to FIG. 6A. FIG. 9B is a perspective view illustrating a cover according to an embodiment of the inventive concept, which is illustrated to correspond to FIG. 6B. Hereinafter, the inventive concept will be described with reference to FIG. 9A and FIG. 9B. The same reference numerals will be given to the same components as those described with reference to FIG. 1A to FIG. 8B, and to the extent that a description of an element is omitted, it may be assumed that the element is at least similar to corresponding elements that have been described elsewhere within the present disclosure.

A lower portion LPT-2 may include a cover CV-T overlapping at least a folding portion S-F on a plane. The cover CV-T may include through portions TH_T1 and TH_T2 arranged spaced apart from each other along the second direction DR2. Each of the through portions TH_T1 and TH_T2 may be formed by passing through an upper surface US and a lower surface LS. For example, a through direction of each of the through portions TH_T1 and TH_T2 may be the same as the third direction DR3.

In the present embodiment, each of widths WL1 and WL2 of the through portions TH_T1 and TH_T2 may be smaller than a width of any one opening OP in the second direction DR2. Accordingly, it is possible to reduce the possibility that the through portions TH_T1 and TH_T2 may be visually recognized from the outside due to rear surface projection or the like. This is only exemplarily illustrated, and as described above, the widths WL1 and WL2 of the through portions TH_T1 and TH_T2 may be designed to have various values as long as the through portions TH_T1 and TH_T2 may communicate with the opening OP. In addition, the widths WL1 and WL2 of the through portions TH_T1 and TH_T2 may be designed independently from each other, and thus may be the same as or different from each other, and is not necessarily limited to any one embodiment.

Depths DT1 and DT2 of the through portions TH_T1 and TH_T2 may be the same as a thickness of the cover CV-T. For example, each of the depths DT1 and DT2 may correspond to the thickness of an adhesive ADM and the thickness of a base BSM. Therefore, each of the through portions TH_T1 and TH_T2 may be provided in the form of a through hole passing through the upper surface US and the lower surface LS. Since the through portions TH_T1 and TH_T2 pass through the lower surface LS in addition to the upper surface US, it is possible to allow the opening OP positioned on the upper surface US to communicate with the outside even though another surface is not additionally passed through. Therefore, the through-portions TH_T1 and TH_T2 are not extended to first to fourth side surfaces SS1, SS2, SS3, and SS4, and may be defined at positions spaced apart from the first to fourth side surfaces SS1, SS2, SS3, and SS4 on a plane. This is only exemplarily illustrated, and the depths DT1 and DT2 of the respective through portions TH_T1 and TH_T2 may be different from each other, and a through portion among the through portions TH_T1 and TH_T2 which has a depth lower than the thickness of the cover CV-T may pass through at least one of the first to fourth side surfaces SS1, SS2, SS3, and SS4. The cover CV-T according to an embodiment of the inventive concept may include a through portion having various through shapes, and is not necessarily limited to any one embodiment. For example, the present embodiment illustrates through portions TH_T extending along the first direction DR1, but the embodiment of the inventive concept is not necessarily limited thereto, and a cover having through portions extending along the second direction DR2, disposed spaced apart along the first direction DR1, and not reaching any of first to fourth sides may be implemented.

FIG. 10A to FIG. 10D are plan views of a cover according to an embodiment of the inventive concept. For ease of description, FIG. 10A to FIG. 10D illustrate only the adhesives. A base might not be passed through by a through portion, or may be passed through in the same form by the illustrated through portion. Hereinafter, with reference to FIG. 10A to FIG. 10D, the inventive concept will be described.

Figure 10A:
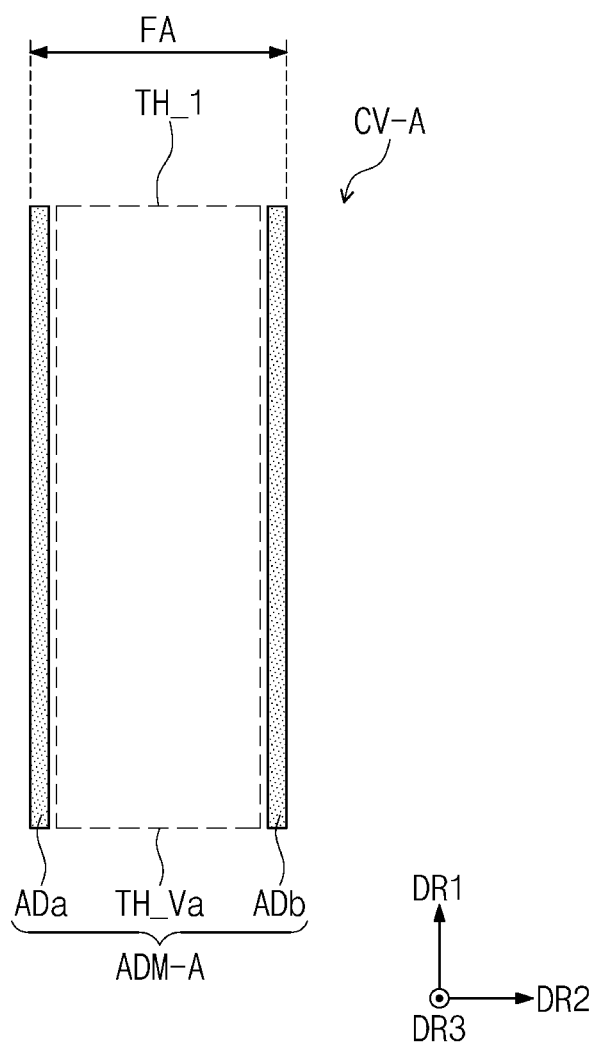

As illustrated in FIG. 10A, a cover CV-A may include an adhesive ADM-A in which a through portion TH_Va is defined. The through portion TH_Va may pass through the adhesive ADM-A along the first direction DR1. Since the through portion TH_Va extends while passing through two side surfaces of the cover CV-A which face each other in the first direction DR1, the adhesive ADM-A may be divided into two portions Ada and ADb, which are spaced apart from each other in the second direction DR2 with the through portion TH_Va interposed therebetween. The through portion TH_Va may or might not pass through the base BSM (see FIG. 5A). Since the opening OP (see FIG. 5A) already communicates with the outside of the cover CV-A through the two side surfaces, the opening OP might not be sealed regardless of whether the base BSM is passed through or not. For example, the base BSM may be provided in a single body quadrangular shape overlapping the folding region FA, or may be divided into two portions corresponding to the two portions Ada and ADb of the adhesive ADM-A.

Alternatively, as illustrated in FIG. 10B, in a cover CV-B, a plurality of through portions Th_2a and TH_2b may be provided. The plurality of through portions Th_2a and TH_2b may be defined spaced apart from each other along the second direction DR2. Each of the through portions Th_2a and Th_2b extends while passing through two side surfaces of the cover CV-B which face each other in the first direction DR1. Accordingly, an adhesive ADM-B may be divided into three portions AD1a, AD1b, and Ad1c which are arranged spaced apart from each other along the second direction. The through portions Th_2a and Th_2b may or might not pass through the base BSM. For example, the base BSM may be provided in a single body quadrangular shape overlapping the folding region FA, or may be divided into three portions corresponding to the three portions AD1a, AD1b, and Ad1c of the adhesive ADM-B.

Figure 10C:
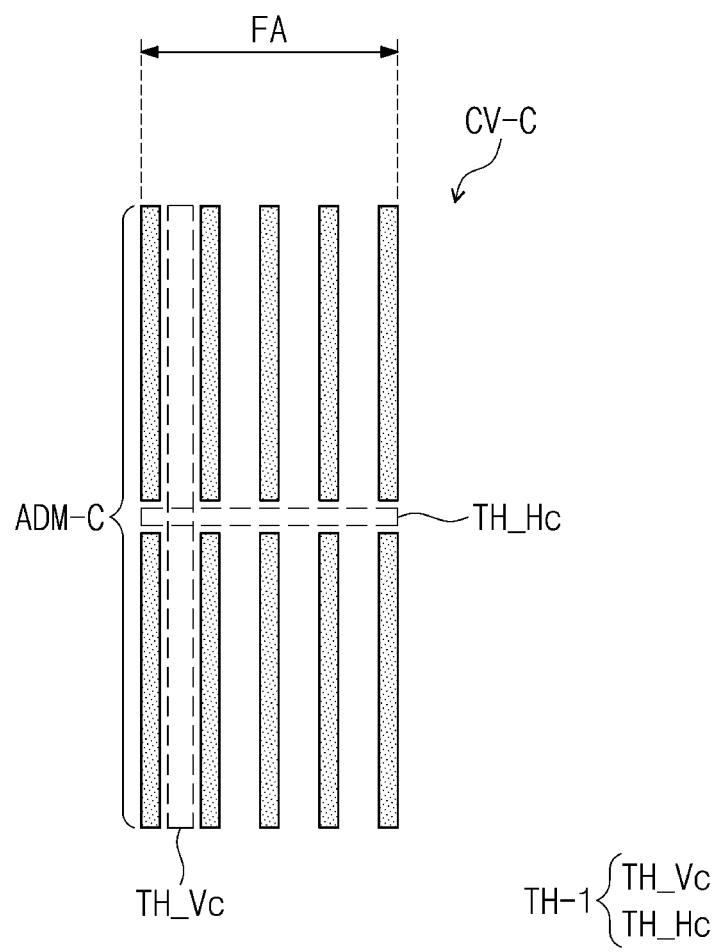

Alternatively, as illustrated in FIG. 10C, in a cover CV-C, a through portion TH-1 may be defined by at least two different through directions. The through portion TH-1 may include a first portion extending along the first direction DR1 or the second direction DR2 and a second portion extending in a direction crossing the first portion.

For example, the through portion TH-1 may include a plurality of first portions TH_Vc (hereinafter, referred to as first vertical portions) passing through along the first direction DR1 and a second portion TH_Hc (hereinafter, referred to as a first horizontal portion) passing through along the second direction DR2. The first vertical portions TH_Vc and the first horizontal portion TH_Hc cross each other on a plane. The first vertical portions TH_Vc and the first horizontal portion TH_Hc may communicate with each other to define one through portion TH-1. Since each of the first vertical portions TH_Vc passes through an adhesive ADM-C along the first direction DR1 and the first horizontal portion TH_Hc passes through the adhesive along the second direction, the adhesive may be divided into a plurality of portions arranged in a matrix form. According to the inventive concept, a through portion having various through directions may allow various communication paths with the outside. Accordingly, the sealing of the opening OP may be reduced.

Figure 10D:
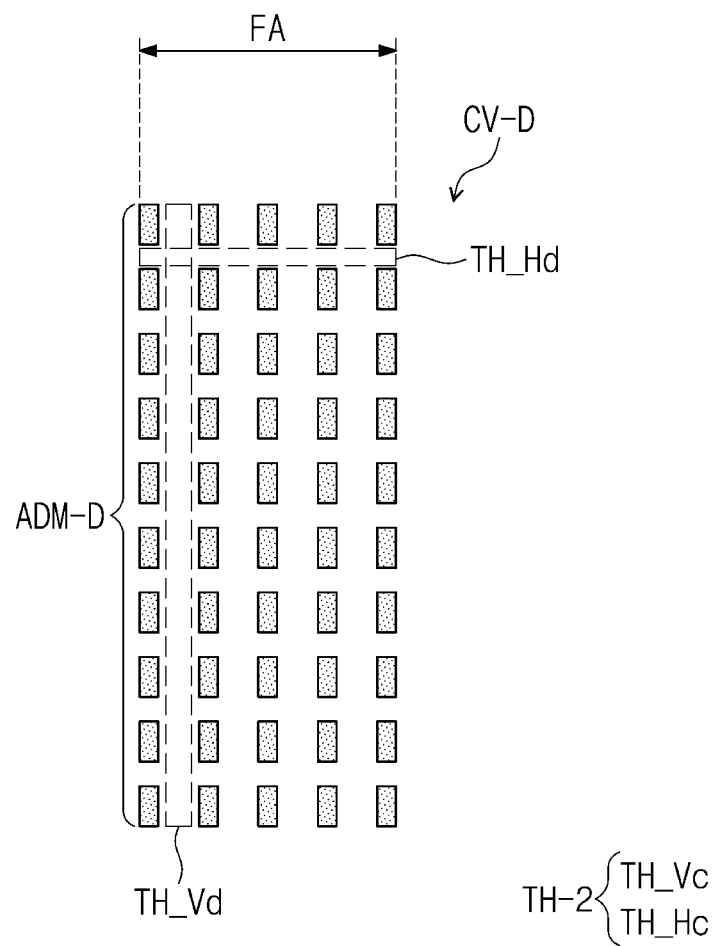

Alternatively, as illustrated in FIG. 10D, a through portion TH-2 may include a plurality of first portions TH_Hd (hereinafter, referred to as second horizontal portions) and a plurality of second portions TH_Vd (hereinafter, referred to as second vertical portions). The second horizontal portions TH_Hd and the second vertical portions TH_Vd may communicate with each other to define one through portion TH-2. An adhesive ADM-D may be divided into a larger number as the through direction become more diversified, and the sealing force with respect to the opening OP may be reduced.

Figure 11A:
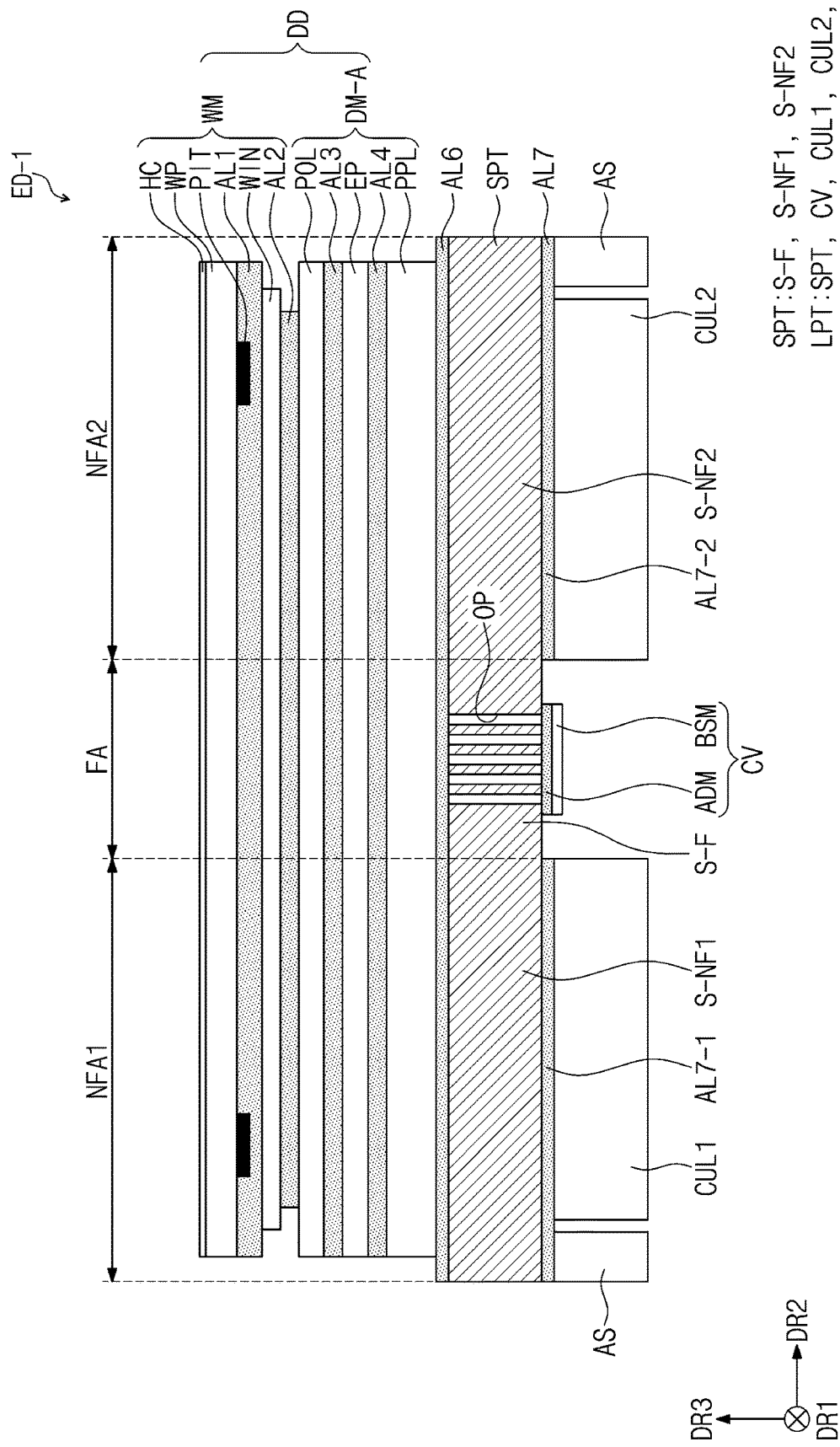
FIG. 11A and FIG. 11B are cross-sectional views of an electronic apparatus according to an embodiment of the inventive concept.
Figure 11B:
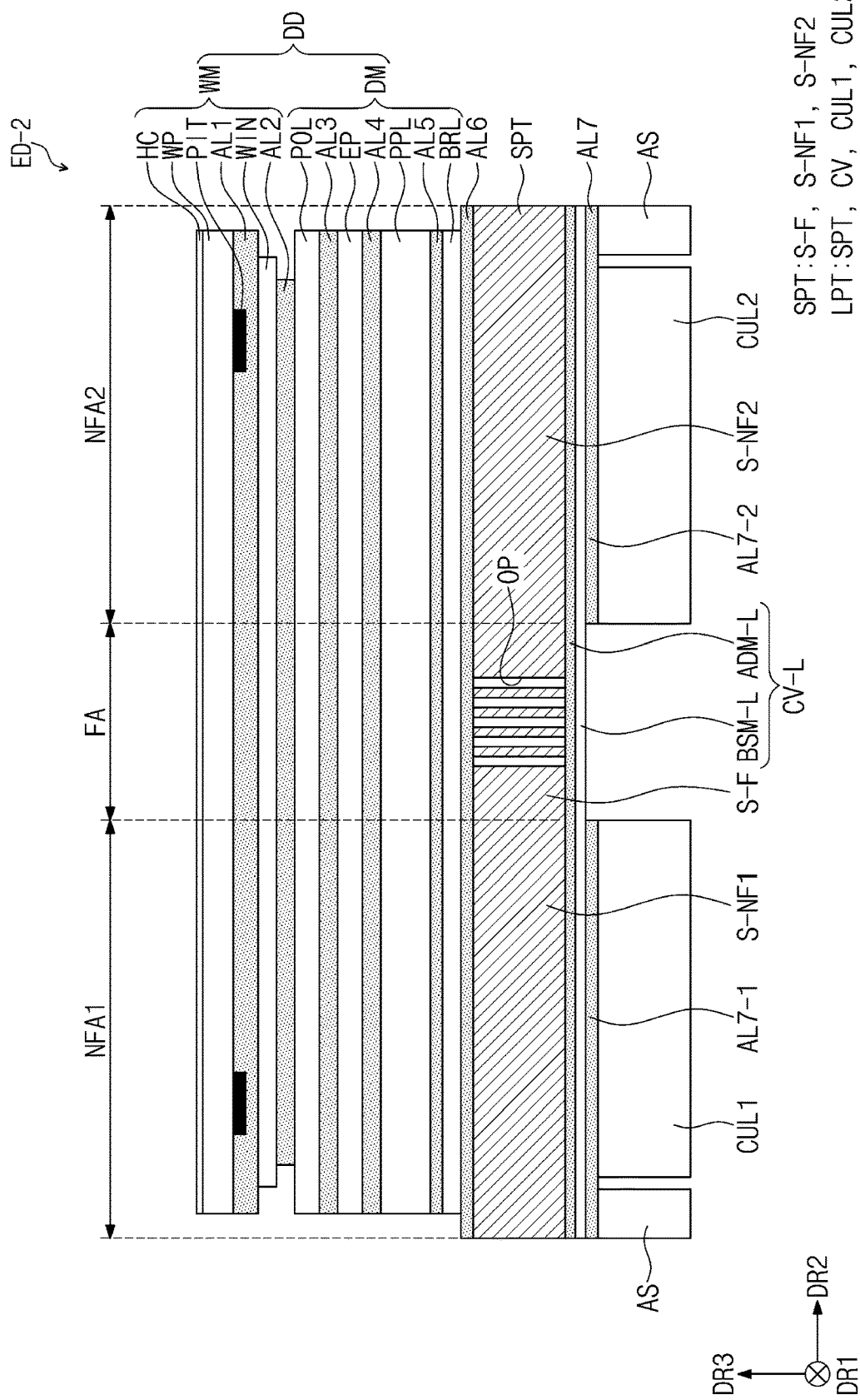

FIG. 11A and FIG. 11B are cross-sectional views of an electronic apparatus according to an embodiment of the inventive concept. FIG. 11A and FIG. 11B are illustrated to correspond to FIG. 5A. Hereinafter, the inventive concept will be described with reference to FIG. 11A and FIG. 11B. The same reference numerals will be given to the same components as those described with reference to FIG. 1A to FIG. 10D, and to the extent that a description of an element is omitted, it may be assumed that the element is at least similar to corresponding elements that have been described elsewhere within the present disclosure.

As illustrated in FIG. 11A, the electronic apparatus ED-1 may have a structure in which the lower barrier layer BRL is omitted, unlike the electronic apparatus ED (see FIG. 5A) illustrated in FIG. 5A. Accordingly, the lowermost component of a display module DM-A attached to the lower portion LPT through the sixth adhesive layer AL6 may be the panel protection layer PPL. In this case, the function of the lower barrier layer BRL may be replaced by including a material having a high light absorption rate or adding a light absorption coating layer to the panel protection layer PPL or the substrate (see FIG. 4C) of the electronic panel EP. The electronic device ED-1 according to the inventive concept may reduce the thickness of the display module DM-a by omitting the lower barrier layer BRL, so that a folding operation may be facilitated.

Alternatively, as illustrated in FIG. 11B, in an electronic apparatus ED-2, a cover CV-L may overlap the folding region FA, and the first and second non-folding regions NFA1 and NFA2 on a plane. For example, when compared to the electronic apparatus ED illustrated in FIG. 5A, the cover CV-L may additionally cover first and second support portions S-NF1 and S-NF2 as well as the folding portion S-F when compared to the cover CV (see FIG. 5A) illustrated in FIG. 5A. A through portion communicating with the openings OP is formed on the cover CV-L according to an embodiment of the inventive concept. The cover CV-L may allow the openings OP to communicate with the outside through the through portion. In addition, since the cover CV-L is provided as a single body covering the entire lower surface of the support plate SPT, the assemblability of the electronic apparatus ED-2 may be increased.

FIG. 12A to FIG. 12E are plan views of a cover according to an embodiment of the inventive concept. For ease of description, FIG. 12A to FIG. 12E illustrate only the adhesives. A base might not be passed through by a through portion, or may be passed through in the same form by the illustrated through portion. FIG. 12A to FIG. 12D illustrate embodiments having a shape corresponding to the cover CV-L illustrated in FIG. 11B. Hereinafter the inventive concept will be described with reference to FIG. 12A to FIG. 12D.

Figure 12A:
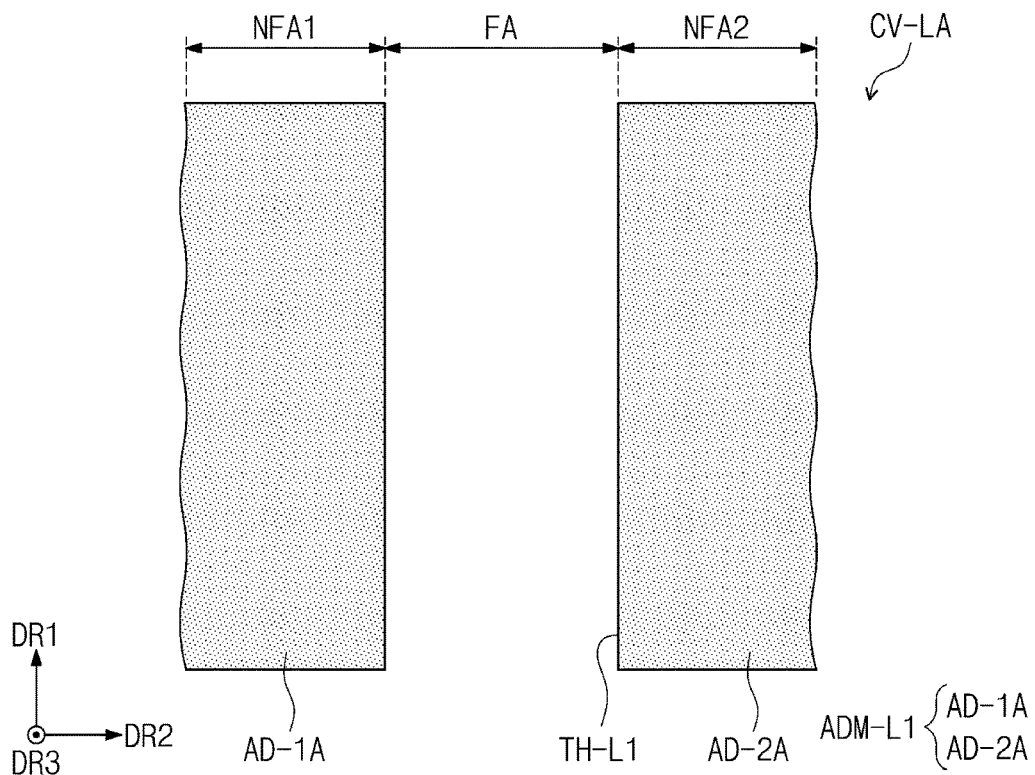
FIG. 12A to FIG. 12E are plan views of a cover according to an embodiment of the inventive concept.

As illustrated in FIG. 12A, in a cover CV-LA, a through portion TH_L1 extends along the first direction DR1 and passes through an adhesive ADM-L1 to divide the adhesive ADM-L1 into two portions AD-1A and AD-2A. The through portion TH_L1 is defined in the folding region FA, and a width in the second direction DR2 may correspond to the folding region FA. The two portions AD-1A and AD-2A may respectively overlap the first non-folding region NFA1 and the second non-folding region NFA2. However, this is only exemplarily illustrated, and as long as the through portion TH_L1 overlaps the opening OP (see FIG. 11B) on a plane, the width in the second direction DR2 may be variously changed, and is not necessarily limited to any one embodiment.

Figure 12B:
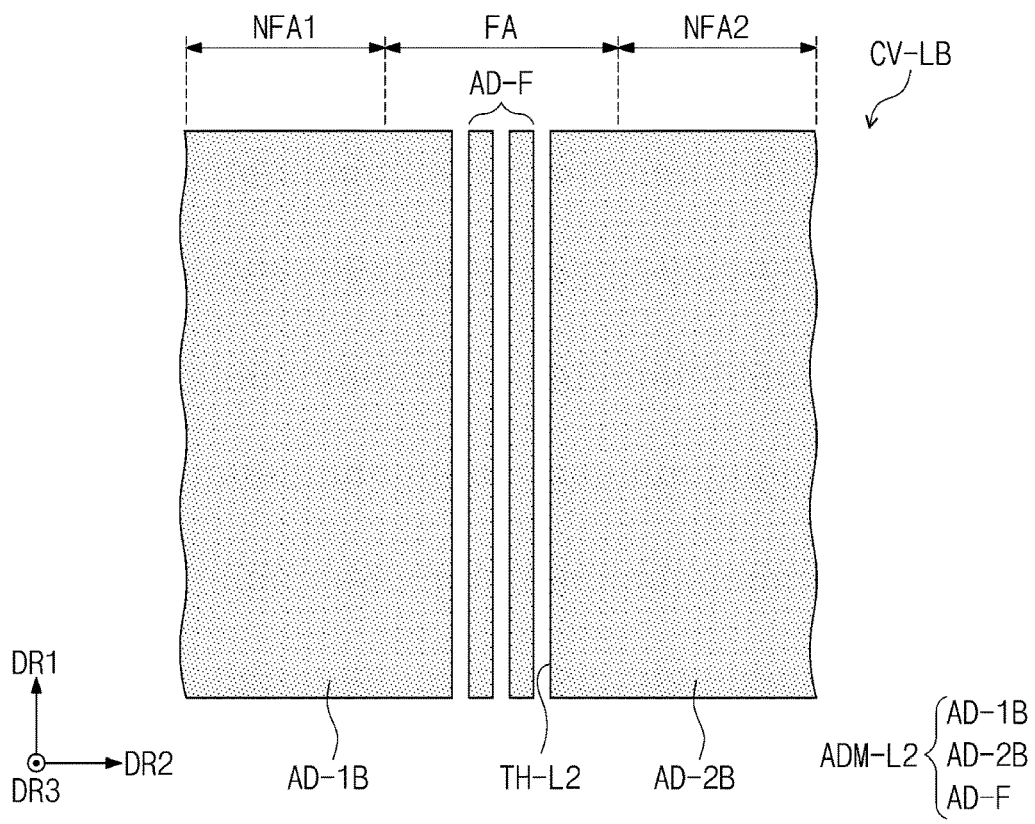

As illustrated in FIG. 12B, in a cover CV-LB, a through portion TH_L2 may be provided in plural, spaced apart along the second direction DR2. Since the through portion TH_L2 extends while passing through two side surfaces of the cover CV-LB which face each other in the first direction DR1, an adhesive ADM-L2 may be divided by the through portions TH_L2 into a plurality of portions AD-1B, AD-F, and AD-2B and spaced apart along the second direction DR2. The portions AD-1B, AD-F, and AD-2B may respectively overlap the first non-folding region NFA1, the folding region FA, and the second non-folding region NFA2. The portion AD-F disposed in the folding region FA is illustrated in plural, but is not necessarily limited thereto. The through portions TH_L2 may or might not pass through the base BSM (see FIG. 5A). Since it already communicates with the outside of the cover CV-LB through the two side surfaces, the opening OP (see FIG. 11B) might not be sealed regardless of whether the base BSM is passed through or not. For example, the base BSM (see FIG. 11B) may be provided in a single body quadrangular shape overlapping the folding region FA, or may be divided into plurality portions respectively corresponding to the portions AD-1B, AD-F, and AD-2B of the adhesive ADM-L2.

Figure 12C:
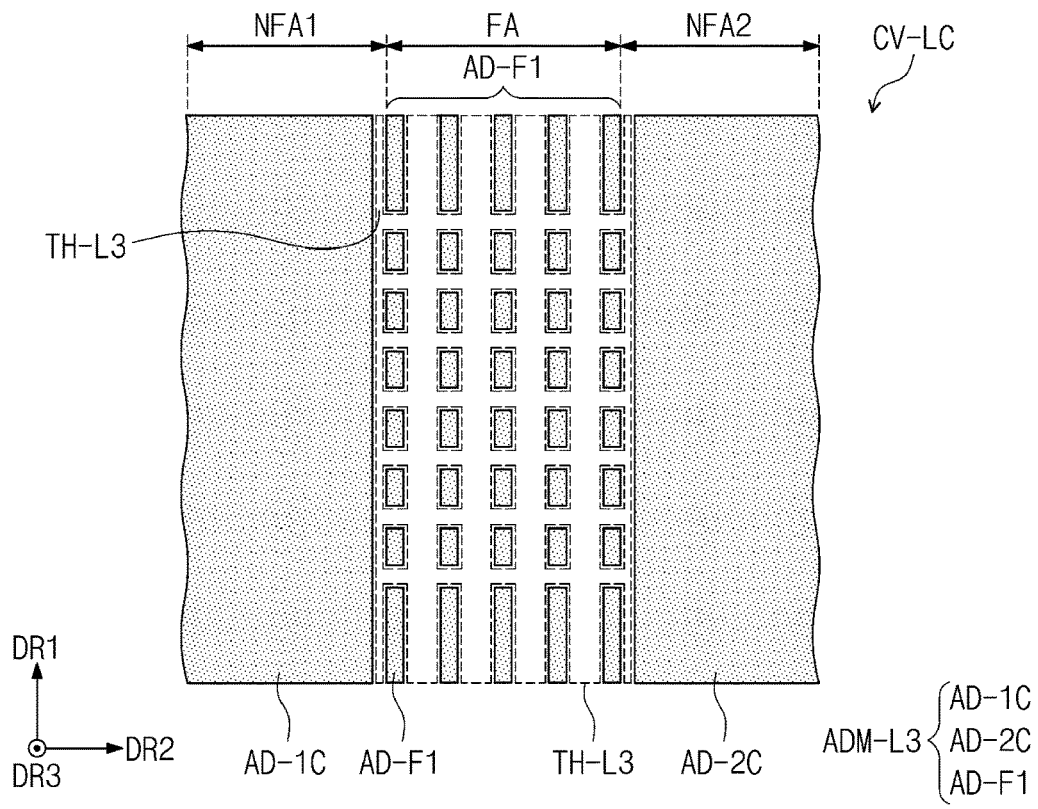

As illustrated in FIG. 12C, in a cover CV-LC, a through portion TH-L3 may be defined by at least two different through directions. Accordingly, the through portion TH-L3 may have a lattice shape overlapping the folding region FA on a plane. An adhesive ADM-L3 may include a first portion AD-1CNFA1 overlapping the first non-folding region AD-1C, a second portion AD-2C overlapping the second non-folding region NFA2, and a plurality of portions AD-F1 overlapping the folding region FA. The portions AD-F1 may be formed by dividing a portion of the adhesive ADM-L3, which overlaps the folding region FA, by the through portion TH-L3. According to the inventive concept, a through portion having various through directions may allow various communication paths with the outside. Accordingly, the sealing of the opening OP may be reduced.

Figure 12D:
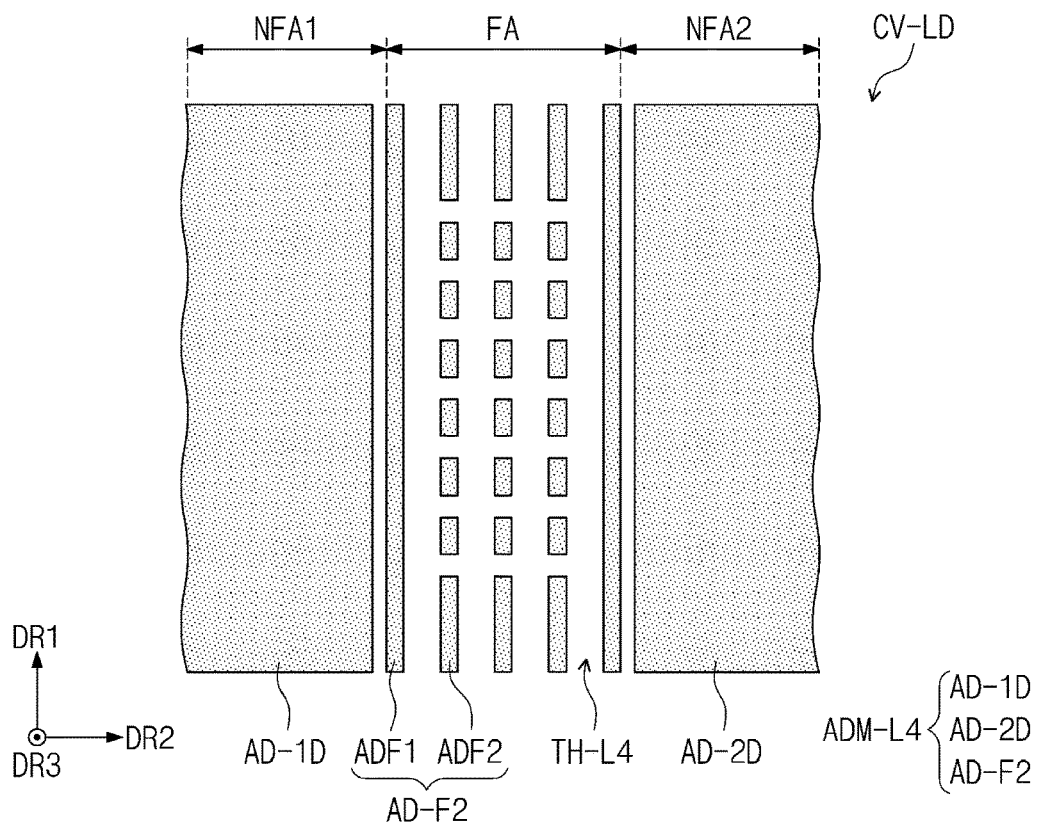

As illustrated in FIG. 12D, in a cover CV-LD, a through portion TH-L4 may be defined by at least two different through directions, and an adhesive ADM-L4 may include a first portion AD-1D overlapping the first non-folding region NFA1, a second portion AD-2D overlapping the second non-folding region NFA2, and a plurality of portions AD-F2 overlapping the folding region FA. The portions AD-F2 may be formed by dividing a portion of the adhesive ADM-L4, which overlaps the folding region FA, by the through portion TH-L4. The portions AD-F2 may include a portion ADF1 having a single body bar shape extending along the first direction DR1 and a portion ADF2 spaced apart from the first direction DR1 and the second direction DR2 and arranged in a matrix shape. For example, the portions AD-F2 may have different shapes from each other, and are not necessarily limited to any one embodiment. According to the inventive concept, a through portion having various through directions may allow various communication paths with the outside. Accordingly, the sealing of the opening OP may be reduced.

Figure 12E:
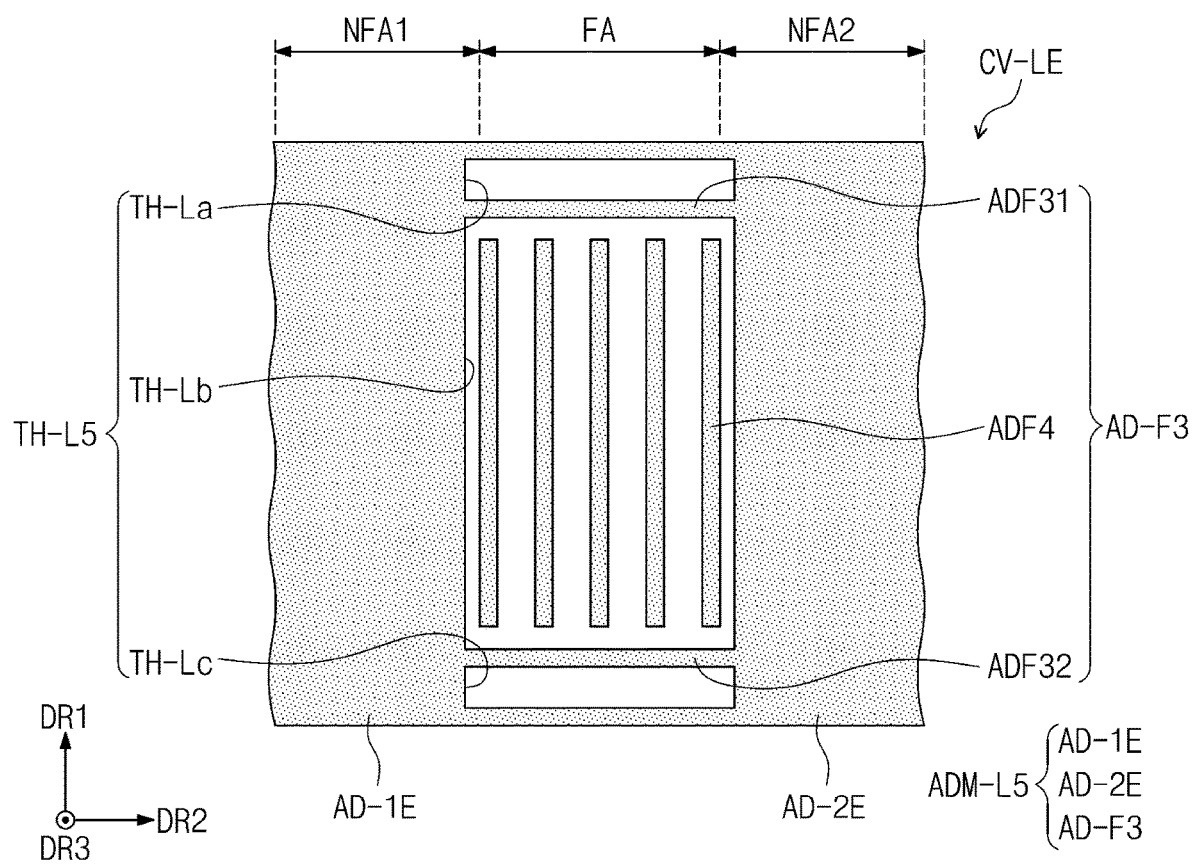

As illustrated in FIG. 12E, in a cover CV-LE, a through portion TH-L5 may include a plurality of through portions TH-La, TH-Lb, and TH-Lc separated from each other and arranged in parallel with the first direction DR1. An adhesive ADM-L5 may include a first portion AD-1CNFA1 overlapping the first non-folding region AD-1E, a second portion AD-2E overlapping the second non-folding region NFA2, and a plurality of portions AD-F3 overlapping the folding region FA.

The portions AD-F3 may include a first horizontal portion ADF31 and a second horizontal portion ADF32 extending along the second direction DR2, and a plurality of vertical portions ADF4 each extending along the first direction DR1 and arranged along the second direction DR2. The first horizontal portion ADF31 may be connected to the first portion AD-1E and the second portion AD-2E and be formed as a single body. The first horizontal portion ADF31 divides two through portions TH-La and TH-Lb. In the same manner, the second horizontal portion ADF32 may be connected to the first portion AD-1E and the second portion AD-2E and be formed as a single body. The second horizontal portion ADF32 divides two through portions TH-Lb and TH-Lc.

The vertical portions ADF4 are disposed spaced apart from each other in the middle through portion TH-Lb. For example, the middle through portion TH-Lb may be defined in the folding region FA to divide the portions AD-F3 of the folding region FA into the plurality of vertical portions ADF4 arranged spaced apart along the second direction DR2. Accordingly, on the cover CV-LE, the through portions TH-La, TH-Lb, and TH-Lc formed in different extension directions on a plane, or having different shapes may be formed, and accordingly, the adhesive ADM-L5 may be divided into a plurality of portions AD-1D, AD-2D, and AD-F3.

Each of the through portions TH-La, TH-Lb, and TH-Lc may be provided as a through hole passing through an insulator. Accordingly, even though each of the through portions TH-La, TH-Lb, and TH-Lc does not extend to an edge of the adhesive ADM-L5 and has a closed-line shape on a plane, the through portions may communicate with the outside by passing through the insulator. According to the inventive concept, a through portion having various through directions may allow various communication paths with the outside. Accordingly, the possibility of occurrence of defects in a process due to the sealing of the opening OP may be reduced.

Figure 13A:
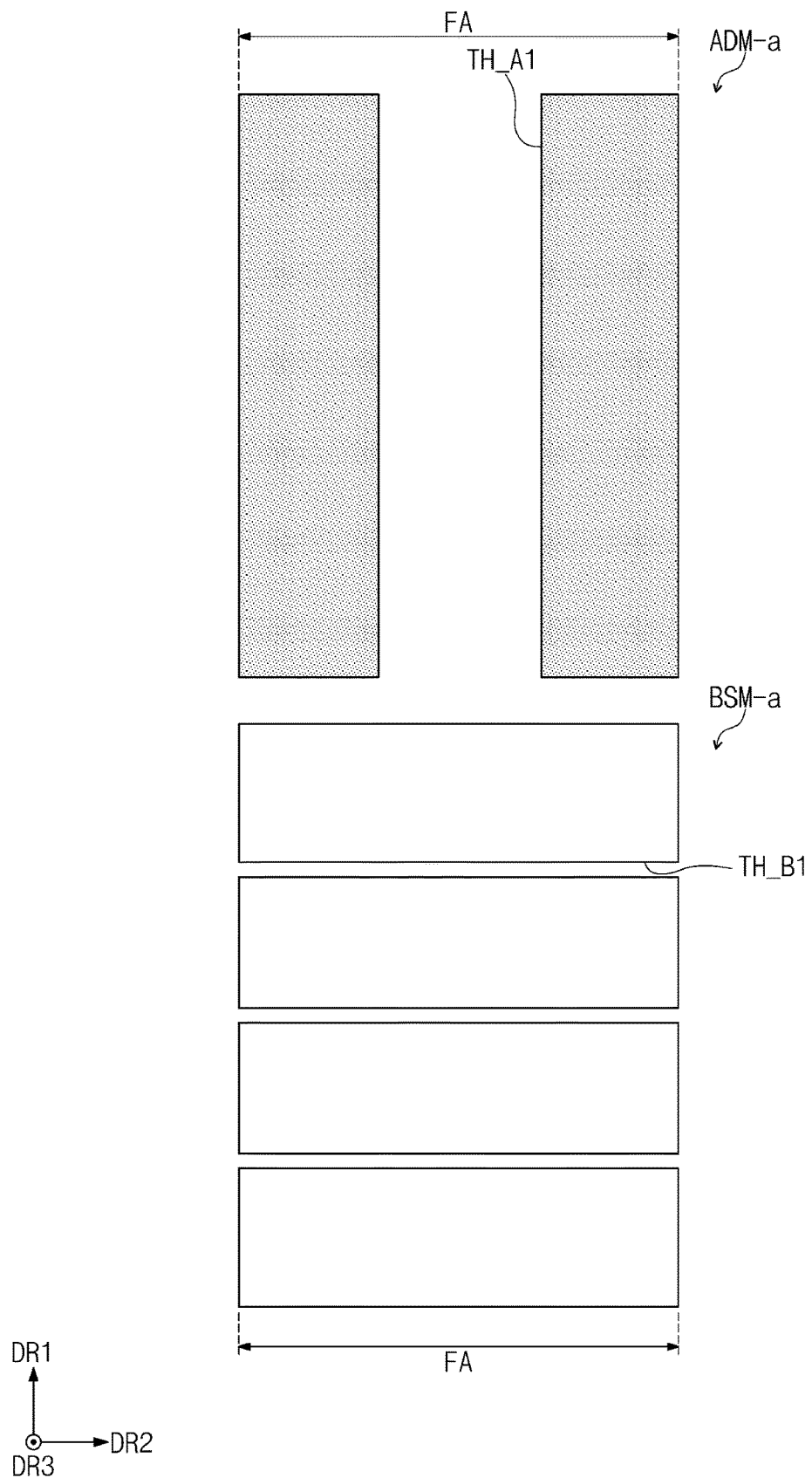
FIG. 13A is an exploded plan view of a cover according to an embodiment of the inventive concept.
Figure 13B:
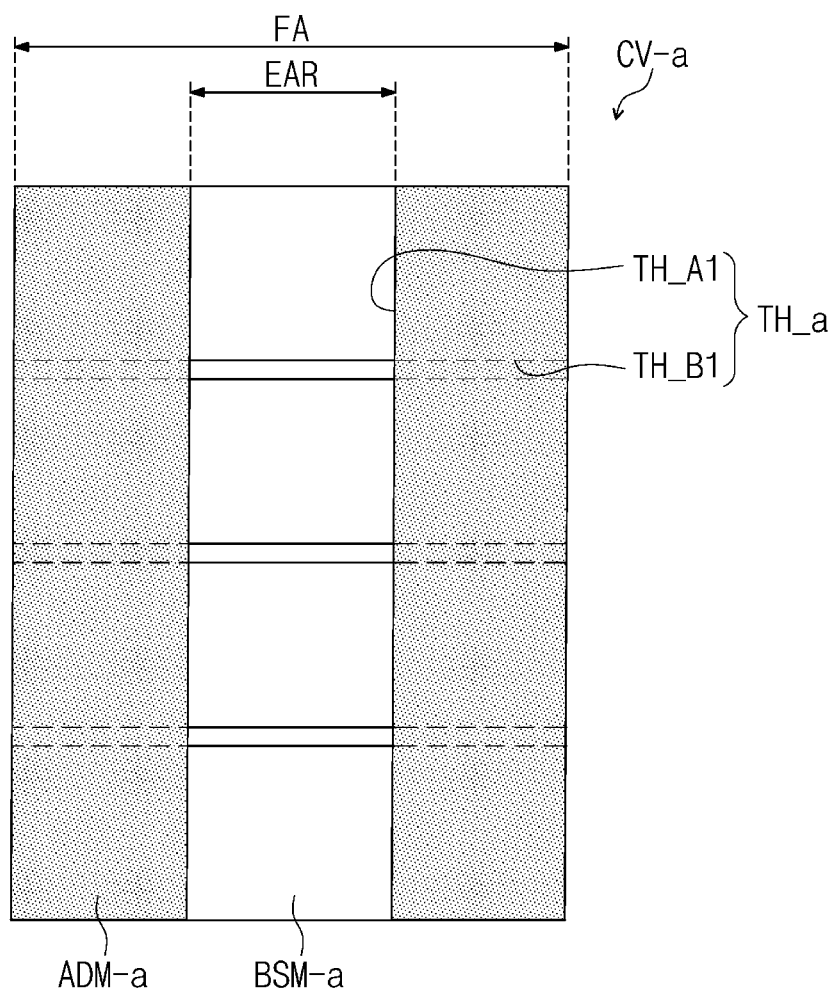
FIG. 13B is a coupled plan view of a cover according to an embodiment of the inventive concept.
Figure 14A:
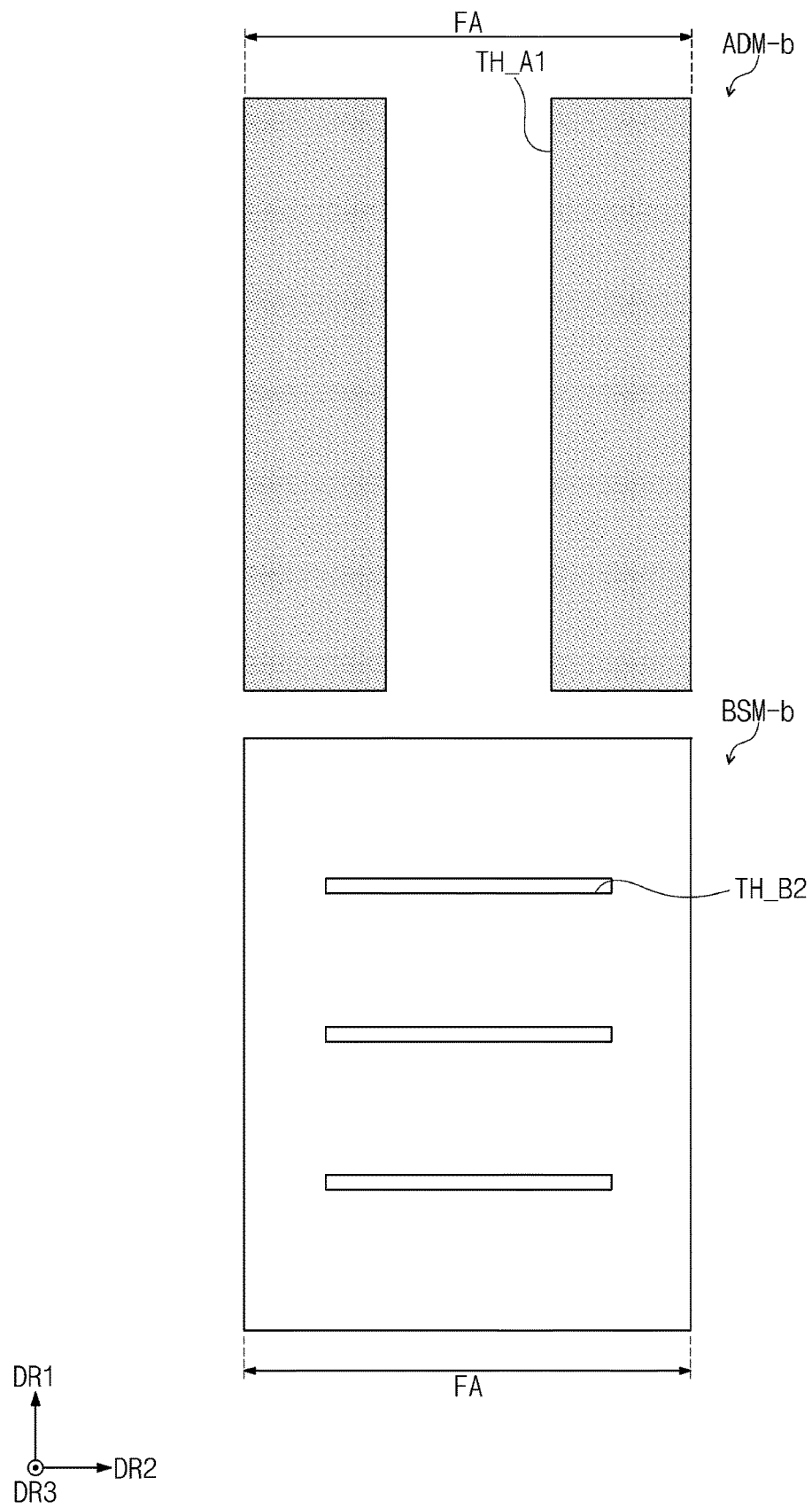
FIG. 14A is an exploded plan view of a cover according to an embodiment of the inventive concept.
Figure 14B:
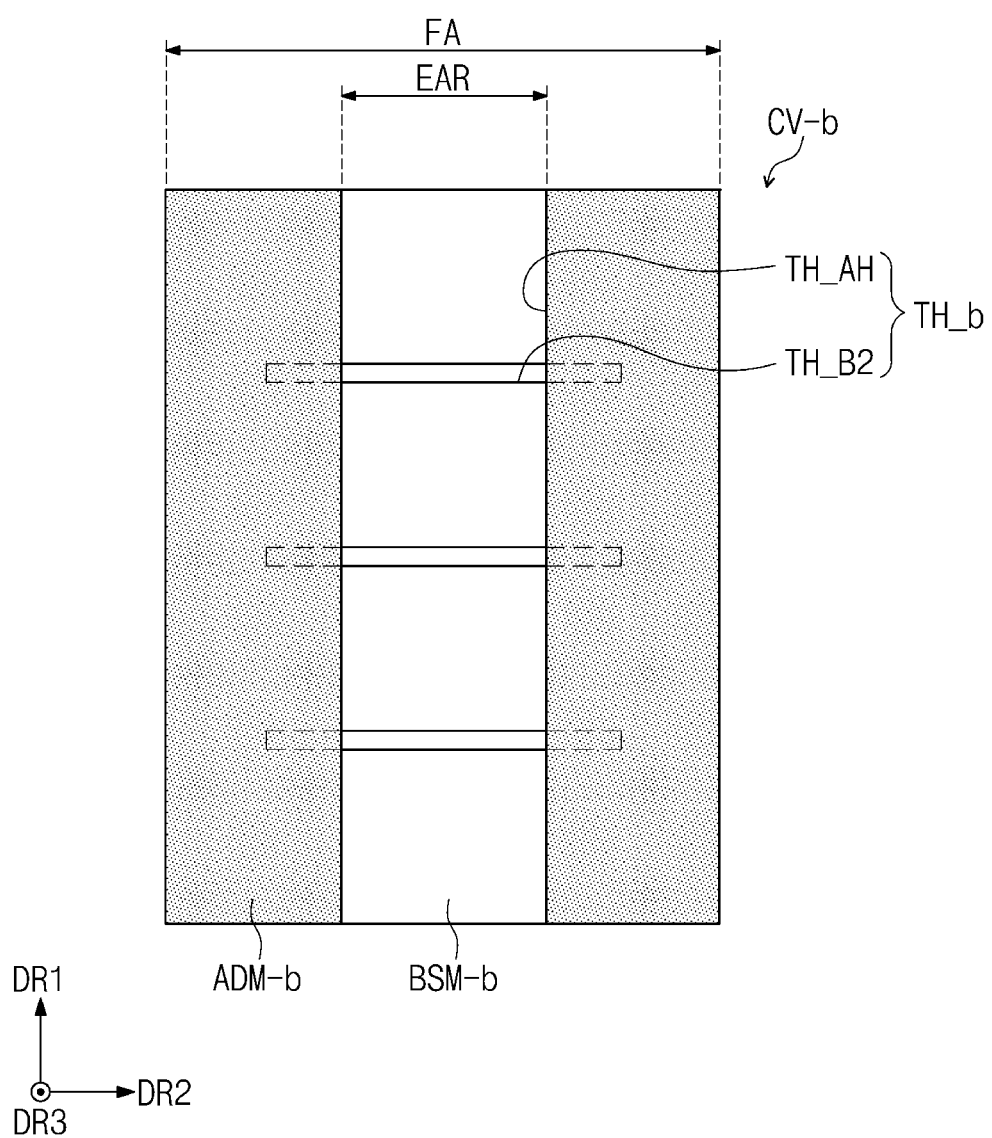
FIG. 14B is a coupled plan view of a cover according to an embodiment of the inventive concept.

FIG. 13A is an exploded plan view of a cover according to an embodiment of the inventive concept. FIG. 13B is a coupled plan view of a cover according to an embodiment of the inventive concept. FIG. 14A is an exploded plan view of a cover according to an embodiment of the inventive concept. FIG. 14B is a coupled plan view of a cover according to an embodiment of the inventive concept.

Referring to FIG. 13A, the shape of a through portion TH_A1 defined in an adhesive ADM-a of the cover CV-a and the shape of a through portion TH_B1 defined in a base BSM-a thereof may be different from each other on a plane. In the present embodiment, the through portion TH_A1 defined in the adhesive ADM-a may have a single bar shape passing through the adhesive ADM-a along the first direction DR1 on a plane. The through portion TH_B1 defined in the base BSM-a may be provided in plural, which are spaced apart along the first direction DR1 and each of which extends along the second direction DR2 and passes through the base BSM-a. For example, a through direction of the through portion TH_A1 defined in the adhesive ADM-a may be the first direction DR1 and a through direction of the through portion TH_B1 passing through the base BSM-a may be the second direction DR2.

Referring to FIG. 13B, as the adhesive ADM-a and the base BSM-a are coupled, the through portion TH_A1 defined in the adhesive ADM-a and the through portion TH_B1 defined in the base BSM-a are connected to define a through portion TH-a of the cover CV-a. As described above, the opening OP (see FIG. 5A) may communicate with the outside via the through portion TH_A1 defined in the adhesive ADM-a, or may communicate with the outside via the through portion TH_A1 defined in the adhesive ADM-a and the through portion TH_B1 defined in the base BSM-a. For example, a valid region EAR which substantially involves in the communication of the opening OP defined in the folding region FA may be a region overlapping, on a plane, the through portion TH_A1 defined in the adhesive ADM-a between the through portion TH_A1 defined in the adhesive ADM-a and the through portion TH_B1 defined in the base BSM-a.

Referring to FIG. 14A, the shape of a through portion TH_A1 defined in an adhesive ADM-b of a cover CV-b and the shape of a through portion TH_B2 defined in a base BSM-b thereof may be different from each other on a plane. In the present embodiment, the through portion TH_A1 defined in the adhesive ADM-b may correspond to the through portion TH_A1 illustrated in FIG. 13A.

The through portion TH_B2 defined in the base BSM-b may be provided in plural, which are spaced apart along the first direction DR1 and each of which extends along the second direction DR2 and passes through the base BSM-b. The through portion TH_B2 defined in the base BSM-b does not extend to side surfaces of the base BSM-b. The through portion TH_B2 defined in the base BSM-b passes through an upper surface and a lower surface of the base BSM-b without passing through the side surfaces thereof. For example, a through direction of the through portion TH_A1 defined in the adhesive ADM-b may be the first direction DR1 and a through direction of the through portion TH_B2 passing through the base BSM-b may be the third direction DR3.

Referring to FIG. 14B, as the adhesive ADM-b and the base BSM-b are coupled, the through portion TH_A1 defined in the adhesive ADM-b and the through portion TH_B2 defined in the base BSM-b are connected to define a through portion TH-b of the cover CV-b. The valid region EAR which substantially involves in the communication of the opening OP defined in the folding region FA may be a region overlapping, on a plane, the through portion TH_A1 defined in the adhesive ADM-b between the through portion TH_A1 defined in the adhesive ADM-a and the through portion TH_B2 defined in the base BSM-b.

In the present embodiment, the through portion TH_a in the valid region EAR of the cover CV-a illustrated in FIG. 13B and the through portion TH_b in the valid region EAR of the cover CV-b illustrated in FIG. 14B may have substantially the same shape. For example, according to the inventive concept, a predetermined through portion defined on a cover may have various shapes, and the shape of the through portion TH_A1 defined in the adhesives ADM-a and ADM-b or the shape of the through portions TH_B1 and TH_B2 defined in the bases BSM-a and BSM-b may be independent from each other. For example, a through portion may be formed on the covers CV-a and CV-b through various combinations of the shape of the through portion TH_A1 defined in the adhesives ADM-a and ADM-b or the shape of the through portions TH_B1 and TH_B2 defined in the bases BSM-a and BSM-b.

According to the inventive concept, it is possible to prevent wrinkle defects and the like which may occur after vacuum lamination, thereby increasing process reliability and visibility. In addition, according to the inventive concept, it is possible to provide a lightweight foldable electronic apparatus.

Although the present invention has been described with reference to preferred embodiments of the present invention, it will be understood by those skilled in the art that various modifications and changes in form and details may be made therein without departing from the spirit and scope of the present disclosure.

What is claimed is:

1. An electronic apparatus, comprising:
a display module including a folding portion folded about a folding axis that extends in a first direction and first and second non-folding portions spaced apart from each other with the folding portion interposed therebetween in a second direction crossing the first direction;
a support plate disposed on a lower side of the display module and including a plurality of openings defined in a region overlapping the folding portion;
an adhesive layer attached on an upper side of the support plate and overlapping the folding portion, the first non-folding portion, and the second non-folding portion; and
a cover attached on a lower side of the support plate, and overlapping at least the folding portion,
wherein a through portion passing through the cover along a through direction, and having a depth defined along a third direction which is perpendicular to the first and second directions is defined on the cover, and
wherein the through portion is connected to at least one of the openings.

2. The electronic apparatus of claim 1, wherein the cover comprises a base and an adhesive in contact with the base and the support plate.

3. The electronic apparatus of claim 2, wherein the through direction of the through portion is parallel to each of the first direction and the second direction.

4. The electronic apparatus of claim 3, wherein the depth of the through portion is less than the thickness of the cover.

5. The electronic apparatus of claim 3, wherein:
the through portion extends along the first direction; and
the width of the through portion in the second direction is less than the width of each of the openings in the second direction.

6. The electronic apparatus of claim 2, wherein the through direction of the through portion is equal to the third direction.

7. The electronic apparatus of claim 6, wherein the area of the through portion is less than the area of each of the openings.

8. The electronic apparatus of claim 2, wherein the through portion comprises:
a first through portion passing through the adhesive along a first through direction and overlapping at least one of the openings; and
a second through portion passing through the base along a second through direction and overlapping at least a portion of the first through portion.

9. The electronic apparatus of claim 8, wherein the first through portion and the second through portion are entirely overlapped.

10. The electronic apparatus of claim 8, wherein the first through direction and the second through direction are different from each other.

11. The electronic apparatus of claim 1, wherein:
the through direction is provided in plural; and the through portion comprises:
- a first portion extending along a direction parallel to the first direction or the second direction; and
- a second portion crossing the first portion.

12. The electronic apparatus of claim 1, wherein the display module has a dumbbell shape when in a folded state.

13. The electronic apparatus of claim 1, wherein the display module further comprises a barrier layer having a high light absorption rate, wherein the barrier layer is in contact with the adhesive layer.

14. An electronic apparatus, comprising:
- a display module including a folding portion folded about a folding axis extending along a first direction and first and second non-folding portions spaced apart from each other with the folding portion interposed therebetween in a second direction crossing the first direction;
- a support plate disposed on a lower side of the display module and including a plurality of openings defined in a region overlapping the folding portion;
- an adhesive layer disposed on an upper side of the support plate and overlapping the folding portion, the first non-folding portion, and the second non-folding portion; and
- a cover disposed on a lower side of the support plate, and overlapping at least the folding portion,
    - wherein the cover includes an upper surface facing the support plate, a lower surface facing the upper surface, and a plurality of side surfaces connecting the upper surface and the lower surface to one another,
    - wherein a through portion passing through the upper surface and at least one other surface is defined on the cover, and
    - wherein the through portion overlaps at least one of the openings.

15. The electronic apparatus of claim 14, wherein the through portion passes through the upper surface and the lower surface.

16. The electronic apparatus of claim 15, wherein the through portion further passes through at least one of the side surfaces.

17. The electronic apparatus of claim 14, wherein:
- the cover comprises a base, and an adhesive disposed between the base and the support plate and attached to each thereof; and
- the upper surface is an upper surface of the adhesive.

18. The electronic apparatus of claim 17, wherein the through portion passes through the adhesive.

19. The electronic apparatus of claim 17, wherein the through portion passes through the adhesive and the base.

20. The electronic apparatus of claim 19, wherein the through portion comprises a first through portion defined in the adhesive and a second through portion defined in the base, wherein the first through portion and the second through portion have different shapes from each other.

* * * * *